(12) United States Patent
Nishida

(10) Patent No.: US 11,823,520 B2
(45) Date of Patent: Nov. 21, 2023

(54) MONEY DEPOSITING APPARATUS AND CHECKOUT SYSTEM

(71) Applicant: GLORY LTD., Hyogo (JP)

(72) Inventor: Naoyuki Nishida, Hyogo (JP)

(73) Assignee: GLORY LTD., Hyogo (JP)

( * ) Notice: Subject to any disclaimer, the term of this patent is extended or adjusted under 35 U.S.C. 154(b) by 261 days.

(21) Appl. No.: 17/315,914

(22) Filed: May 10, 2021

(65) Prior Publication Data
US 2021/0264713 A1    Aug. 26, 2021

Related U.S. Application Data

(63) Continuation of application No. 16/217,764, filed on Dec. 12, 2018, now abandoned.

(30) Foreign Application Priority Data

Dec. 13, 2017 (JP) ................................ 2017-239031

(51) Int. Cl.
*G06Q 20/20*         (2012.01)
*G07D 11/60*        (2019.01)
(Continued)

(52) U.S. Cl.
CPC ............. *G07D 11/60* (2019.01); *G06Q 20/20* (2013.01); *G06Q 20/204* (2013.01); *G07D 1/06* (2013.01);
(Continued)

(58) Field of Classification Search
CPC ........ G07D 11/60; G07D 1/06; G07D 11/009; G07D 11/14; G07D 2201/00;
(Continued)

(56) References Cited

U.S. PATENT DOCUMENTS 4,150,740 A * 4/1979 Douno ..................... G07D 1/04
                                                                    902/15
4,638,434 A * 1/1987 Aizaki ............... G06Q 20/1085
                                                                 235/133 R
(Continued)

FOREIGN PATENT DOCUMENTS

EP         1975894 A1     10/2008
GB         201212403         8/2012
(Continued)

OTHER PUBLICATIONS

European Search Report in counterpart Application No. 18210138.6, dated Feb. 27, 2019.

*Primary Examiner* — Ashford S Hayles
(74) *Attorney, Agent, or Firm* — Greenblum & Bernstein, P.L.C.

(57) ABSTRACT

A speedy and efficient checkout process at a checkout counter in a store is realized by a deposit machine that receives deposited money from a customer and issues a pre-deposit receipt with which a pre-deposit amount is associated, and a POS register that scans a barcode of a commodity to calculate a checkout amount and reads a pre-deposit receipt to specify a pre-deposit amount. The POS register performs a checkout process for the checkout amount by using the pre-deposit amount, calculates, as change, a difference between the pre-deposit amount and the checkout amount, and causes a change machine to dispense money corresponding to the change.

10 Claims, 23 Drawing Sheets

(51) Int. Cl.
  *G07D 11/00* (2019.01)
  *G07D 11/14* (2019.01)
  *G07D 1/06* (2006.01)
  *G07G 1/12* (2006.01)

(52) U.S. Cl.
  CPC ........... *G07D 11/009* (2013.01); *G07D 11/14* (2019.01); *G07G 1/12* (2013.01); *G07D 2201/00* (2013.01); *G07D 2211/00* (2013.01)

(58) Field of Classification Search
  CPC .. G07D 2211/00; G06Q 20/20; G06Q 20/204; G07G 1/12
  See application file for complete search history.

(56) References Cited

U.S. PATENT DOCUMENTS

| | | | | |
|---|---|---|---|---|
| 5,010,485 | A * | 4/1991 | Bigari | G06Q 20/10 902/22 |
| 5,119,293 | A * | 6/1992 | Hammond | G06Q 20/20 705/16 |
| 5,239,165 | A * | 8/1993 | Novak | G07F 17/32 235/383 |
| 5,573,082 | A * | 11/1996 | Conlan | G06Q 10/087 186/44 |
| 5,615,759 | A * | 4/1997 | Cadbury | G07G 1/0036 235/7 A |
| 5,620,079 | A * | 4/1997 | Molbak | G07D 1/04 194/347 |
| 5,953,709 | A * | 9/1999 | Gilbert | G06Q 20/20 194/347 |
| 6,175,823 | B1 * | 1/2001 | Van Dusen | G06Q 30/0635 705/26.81 |
| 6,330,544 | B1 * | 12/2001 | Walker | G06Q 20/20 705/16 |
| 6,536,663 | B1 * | 3/2003 | Lozier | G06Q 20/18 235/487 |
| 6,550,671 | B1 * | 4/2003 | Brown | G07D 11/30 235/379 |
| 6,758,393 | B1 * | 7/2004 | Luciano | G07G 1/0018 705/16 |
| 7,131,573 | B2 * | 11/2006 | Suzuki | G06Q 20/20 705/16 |
| 7,403,907 | B1 * | 7/2008 | Gerken, III | G06Q 30/0224 705/16 |
| 7,497,372 | B1 * | 3/2009 | Robinson | G06Q 30/02 235/379 |
| 7,513,419 | B1 * | 4/2009 | Crews | G06Q 20/042 235/379 |
| 8,381,969 | B1 * | 2/2013 | Miller | G06Q 20/382 235/375 |
| 8,561,885 | B1 * | 10/2013 | Folk | G06Q 20/387 235/379 |
| 8,929,640 | B1 * | 1/2015 | Mennie | G06Q 10/00 382/137 |
| 9,230,251 | B1 * | 1/2016 | Vijayvergia | G06Q 20/203 |
| 10,074,081 | B1 * | 9/2018 | Radlow | G06Q 20/20 |
| 10,127,537 | B1 * | 11/2018 | Ellis | G06Q 20/36 |
| 10,380,564 | B1 * | 8/2019 | Wilson | G06Q 20/204 |
| 2002/0046070 | A1 * | 4/2002 | Konishi | G06Q 10/06311 705/16 |
| 2002/0077178 | A1 * | 6/2002 | Oberberger | G07F 17/3248 463/20 |
| 2002/0179401 | A1 * | 12/2002 | Knox | G06Q 20/28 194/217 |
| 2003/0023565 | A1 * | 1/2003 | Kosuda | G06Q 20/18 705/64 |
| 2003/0078094 | A1 * | 4/2003 | Gatto | G07F 19/211 463/25 |
| 2003/0097332 | A1 * | 5/2003 | Golasinski | G06Q 20/14 705/40 |
| 2003/0158782 | A1 * | 8/2003 | Thomson | G06Q 20/04 705/17 |
| 2004/0011621 | A1 * | 1/2004 | Olbrich | G06Q 30/0241 194/217 |
| 2004/0107162 | A1 * | 6/2004 | Giraldin | G07C 11/00 705/39 |
| 2004/0153406 | A1 * | 8/2004 | Alarcon-Luther | G06Q 20/105 705/41 |
| 2005/0080737 | A1 * | 4/2005 | Stein | G06Q 40/00 705/42 |
| 2005/0096135 | A1 * | 5/2005 | Houchin | G07F 17/32 463/42 |
| 2005/0108164 | A1 * | 5/2005 | Salafia, III | G06Q 20/047 705/42 |
| 2005/0182681 | A1 * | 8/2005 | Bruskotter | G06Q 20/204 705/17 |
| 2005/0278188 | A1 * | 12/2005 | Thomson | G06Q 20/382 705/64 |
| 2006/0064379 | A1 * | 3/2006 | Doran | G06Q 20/105 705/42 |
| 2006/0065717 | A1 * | 3/2006 | Hurwitz | G06Q 20/02 235/381 |
| 2006/0068897 | A1 * | 3/2006 | Sanford | G07F 17/3248 463/25 |
| 2006/0069642 | A1 * | 3/2006 | Doran | G06Q 20/108 705/39 |
| 2006/0089909 | A1 * | 4/2006 | McLeod | G06Q 30/06 705/44 |
| 2006/0173791 | A1 * | 8/2006 | Mann, III | G06Q 20/20 705/74 |
| 2006/0206377 | A1 * | 9/2006 | Huber | G07F 7/12 473/292 |
| 2006/0207856 | A1 * | 9/2006 | Dean | G07F 19/20 194/302 |
| 2006/0247824 | A1 * | 11/2006 | Walker | G06Q 30/02 700/241 |
| 2007/0108267 | A1 * | 5/2007 | Jonsson | G07D 11/34 235/379 |
| 2007/0108270 | A1 * | 5/2007 | Bjoraker | G06Q 20/20 705/17 |
| 2007/0175979 | A1 * | 8/2007 | Yokota | G07B 15/00 235/382.5 |
| 2007/0187494 | A1 * | 8/2007 | Hanna | G06Q 20/352 235/383 |
| 2007/0199796 | A1 * | 8/2007 | Gunst | G07F 19/20 194/350 |
| 2007/0210149 | A1 * | 9/2007 | Osterberg | G07D 11/60 235/379 |
| 2007/0239545 | A1 * | 10/2007 | Mothwurf | G07B 3/00 705/14.39 |
| 2008/0114658 | A1 * | 5/2008 | Weitzman | G06Q 20/042 705/17 |
| 2008/0228591 | A1 * | 9/2008 | Watanabe | G06Q 30/06 705/27.1 |
| 2008/0243702 | A1 * | 10/2008 | Hart | H04L 9/3234 705/69 |
| 2009/0101723 | A1 | 4/2009 | Uehara et al. | |
| 2009/0120760 | A1 * | 5/2009 | Sjostrom | G07D 9/04 194/302 |
| 2009/0287579 | A1 * | 11/2009 | Walker | G06Q 40/02 705/44 |
| 2009/0320106 | A1 * | 12/2009 | Jones | G06Q 40/02 726/5 |
| 2010/0179682 | A1 * | 7/2010 | Hamasaki | G07F 19/203 700/214 |
| 2010/0250385 | A1 * | 9/2010 | Lempel | G06Q 30/0601 705/26.1 |
| 2010/0268587 | A1 * | 10/2010 | Buchheit | G06Q 30/0226 705/14.32 |
| 2010/0280945 | A1 * | 11/2010 | Vago | G06Q 20/10 705/41 |
| 2011/0086696 | A1 * | 4/2011 | MacEwan | G07F 17/32 463/43 |
| 2011/0183745 | A1 * | 7/2011 | Gagner | G07F 17/3286 463/25 |
| 2011/0208561 | A1 * | 8/2011 | Randall | G06Q 20/209 705/1.1 |

(56) References Cited

U.S. PATENT DOCUMENTS

| | | | | |
|---|---|---|---|---|
| 2011/0231304 A1* | 9/2011 | Peyret | G06Q 20/10 | 705/39 |
| 2012/0203572 A1* | 8/2012 | Christensen | G06Q 30/02 | 705/2 |
| 2013/0073407 A1* | 3/2013 | Setoui | G06Q 30/06 | 705/23 |
| 2013/0080325 A1* | 3/2013 | Schatt | G07F 19/20 | 705/44 |
| 2013/0103519 A1* | 4/2013 | Kountotsis | G06Q 20/28 | 705/23 |
| 2013/0132217 A1* | 5/2013 | Yahn | G07F 9/001 | 194/215 |
| 2014/0110219 A1* | 4/2014 | Higashiyama | G07F 19/203 | 194/216 |
| 2014/0222660 A1* | 8/2014 | Huang | G07F 19/209 | 705/39 |
| 2014/0374477 A1* | 12/2014 | Korala | G06Q 20/042 | 235/379 |
| 2015/0087408 A1* | 3/2015 | Siemasko | G06Q 30/0207 | 463/25 |
| 2015/0220899 A1* | 8/2015 | Namura | G06Q 20/387 | 705/17 |
| 2015/0379495 A1* | 12/2015 | Nakagawa | G07D 11/0087 | 705/16 |
| 2016/0034875 A1* | 2/2016 | Stevens | G06Q 20/10 | 705/72 |
| 2016/0042340 A1* | 2/2016 | Burke | G06Q 20/382 | 705/21 |
| 2016/0117672 A1* | 4/2016 | Tan | G06Q 20/3278 | 705/39 |
| 2016/0350993 A1 | 12/2016 | Doi et al. | | |
| 2017/0092062 A1* | 3/2017 | Tsutsui | G06F 3/0481 | |
| 2017/0169513 A1* | 6/2017 | Perelman | G06Q 40/06 | |
| 2017/0221019 A1* | 8/2017 | Letson | G06Q 20/342 | |
| 2017/0224134 A1* | 8/2017 | Watanabe | G07D 11/60 | |
| 2017/0300889 A1* | 10/2017 | Watanabe | G06Q 20/209 | |
| 2017/0337536 A1* | 11/2017 | Gotanda | G06Q 20/204 | |
| 2017/0337763 A1* | 11/2017 | Susaki | G07D 1/02 | |
| 2017/0337784 A1* | 11/2017 | Gotanda | G06K 19/06028 | |
| 2019/0026703 A1* | 1/2019 | Wang | G06Q 20/389 | |
| 2019/0043033 A1* | 2/2019 | Aoyama | G06Q 20/208 | |
| 2019/0236580 A1* | 8/2019 | Nakamura | G06Q 20/3676 | |

FOREIGN PATENT DOCUMENTS

| | | |
|---|---|---|
| JP | H-01173292 A | 7/1989 |
| JP | H10-49751 | 2/1998 |

* cited by examiner

FIG.14

| IDENTIFICATION INFORMATION | PRE-DEPOSIT AMOUNT | DATE AND TIME | TYPE | ... | DEVICE ID |
|---|---|---|---|---|---|
| A0001 | 5,000 YEN | 2017/7/27 09:03 | CASH | ... | T0322 |
| B1234 | 10,000 YEN | 2017/7/27 13:27 | CASH | ... | T0055 |
| : | : | : | : | ... | : |
| : | : | : | : | ... | : |

MONEY DEPOSITING APPARATUS AND CHECKOUT SYSTEM

CROSS REFERENCE TO RELATED APPLICATION

This is a continuation of U.S. application Ser. No. 16/217,764, filed on Dec. 12, 2018, which claims priority to JP App. No. 2017-239031, filed Dec. 13, 2017. The entire disclosure and contents of each of these applications are hereby incorporated by reference herein in their entirety.

BACKGROUND OF THE INVENTION

Field of the Invention

The present invention relates to a money depositing apparatus and a checkout system which realize speedy and efficient checkout at a checkout counter in a store.

Description of the Background Art

Conventionally, a cash register having a POS (Point Of Sales) function (hereinafter referred to as "POS register") and a money handling apparatus (hereinafter referred to as "change machine") communicably connected to the POS register, are often installed at checkout counters of various stores such as supermarkets. For example, a cashier scans a barcode attached to a commodity with a barcode reader of the POS register to specify the price of the commodity. When the cashier inserts money received from a customer in the change machine, change is dispensed from the change machine.

For example, Japanese Laid-Open Patent Publication No. 10-49751 discloses a technique as follows. That is, when a cashier receives additional money from a customer after a change machine has dispensed change, the cashier inputs, through keys, the amount of the additional money as an additional monetary amount. Thus, an amount of change, which is the sum of the additional monetary amount and the amount of the already dispensed change, is newly calculated, and money corresponding to the newly calculated amount of change is dispensed in a minimum number of pieces of money from the change machine. According to this system, for example, even after change of 450 yen has been dispensed from the change machine, if the customer finds 50 yen in his/her wallet and additionally pays the 50 yen, the cashier, who receives the 50 yen, can return a newly calculated change of 500 yen (e.g., one 500-yen coin) to the customer.

SUMMARY OF THE INVENTION

However, the system according to Japanese Laid-Open Patent Publication No. 10-49751 has a problem that the process performed by the cashier takes time, which may cause a queue of customers waiting for checkout for commodities. Even when a customer does not perform additional payment, the cashier has to scan barcodes attached to commodities to specify a checkout amount, insert money received from the customer in the change machine, confirm change dispensed from the change machine, and return the change to the customer. In addition, when the cashier receives a point card from the customer, the cashier has to handle the point card and return the point card to the customer. Since the cashier is required to perform many processes in order, a queue of waiting customers is formed at the checkout counter during a time period when the store is crowded with many customers.

Therefore, one problem is how to realize a speedy and efficient checkout process when checkout for commodities purchased by a customer is performed with a POS register and a change machine installed in a store. This problem may also occur in: a semi-self-checkout system in which a cashier only performs monetary registration of commodities and a customer is caused to perform checkout for the commodities; and a self-checkout system in which a customer is caused to perform both monetary registration of commodities and checkout for the commodities. The monetary registration of commodities is performed to register information and prices of commodities in a POS system, for the purpose of managing transaction information in the POS system.

The present invention is made to solve the aforementioned problems in the conventional art, and an object of the present invention is to provide a money depositing apparatus and a checkout system which realize a speedy and efficient checkout process at a checkout counter in a store.

In order to solve the aforementioned problem and achieve the object, the present invention is provided with: a money receiving unit configured to receive money; a money storing unit configured to store therein the money received by the money receiving unit; and an association unit configured to associate a negotiable value corresponding to an amount of the money received by the money receiving unit, with a predetermined medium used for checkout for purchasing a commodity.

Furthermore, the present invention is directed to a checkout system in which a POS device and a money handling apparatus are communicably connected, the money handling apparatus being configured to recognize and count money, store the money in a storing unit, and dispense change. The checkout system includes a money depositing apparatus including: a money receiving unit configured to receive money; a money storing unit configured to store therein the money received by the money receiving unit; and an association unit configured to associate a negotiable value corresponding to an amount of the money received by the money receiving unit, with a predetermined medium used for checkout performed by using the money handling apparatus for purchasing a commodity. The POS device is configured to, when an amount of money corresponding to the negotiable value associated with the predetermined medium is more than an amount of money to be paid for the checkout, instruct the money handling apparatus to dispense, as change, money corresponding to a difference between the amount of money associated with the predetermined medium and the amount of money to be paid for the checkout.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 shows a pre-deposit table shown in FIG. 13;

DESCRIPTION OF THE PREFERRED EMBODIMENTS

Hereinafter, an embodiment of a money depositing apparatus and a checkout system according to the present invention will be described with reference to the drawings.

Embodiment 1

<Outline of Checkout System>

Figure 1:
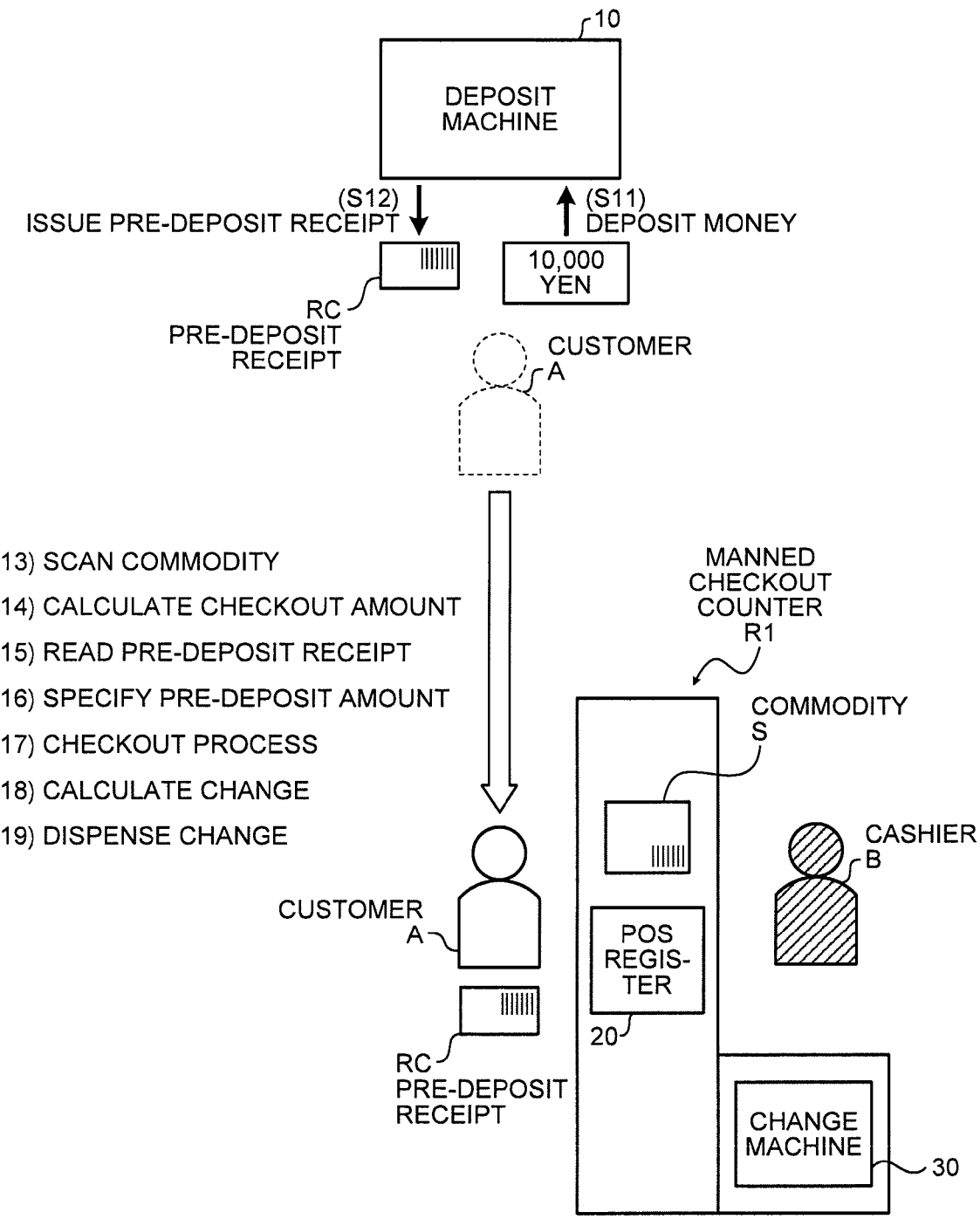
FIG. 1 shows an outline of a checkout system according to an embodiment of the present invention.

An outline of a checkout system according to the present embodiment will be described. FIG. 1 shows the outline of the checkout system according to the present embodiment. The checkout system according to the present embodiment includes a manned checkout counter R1 and a deposit machine 10 in a store such as a supermarket.

On the manned checkout counter R1, a POS register 20 which is a cash register having a POS function, and a change machine 30 which is a money handling apparatus communicably connected to the POS register 20, are installed. A cashier B is assigned to the manned checkout counter R1.

The deposit machine 10 is a money depositing apparatus installed near an entrance of the store, for example. Upon receiving deposited money from a customer, the deposit machine 10 issues a medium with which a negotiable value corresponding to the amount of the deposited money is associated. Specifically, the deposit machine 10 issues a pre-deposit receipt RC on which a barcode indicating the amount of the deposited money is printed. This pre-deposit receipt RC is available for checkout at the manned checkout counter R1.

In the example of FIG. 1, a customer A deposits money worth 10,000 yen in the deposit machine 10 (S11), and the deposit machine 10 issues a pre-deposit receipt RC associated with a negotiable value corresponding to 10,000 yen (S12).

The customer A finds a desired commodity S in the store, and hands the commodity S and the pre-deposit receipt RC to the cashier B at the manned checkout counter R1. The cashier B operates a barcode reader of the POS register 20, thereby causing the POS register 20 to read a barcode attached to the commodity S and the pre-deposit receipt RC.

The POS register 20 scans the barcode of the commodity S (S13), and calculates a checkout amount (S14). The POS register 20 reads the pre-deposit receipt RC (S15), and specifies, as a pre-deposit amount, the amount of money deposited in the deposit machine 10 by the customer A (S16).

The POS register 20 performs a checkout process for the checkout amount by using the pre-deposit amount (S17), and calculates a difference between the pre-deposit amount and the checkout amount, as an amount of change (S18). The POS register 20 causes the change machine 30 to dispense money corresponding to the change (S19).

As described above, in the checkout system according to the present embodiment, the deposit machine 10 receives deposited money, and issues a pre-deposit receipt RC with which a negotiable value corresponding to the amount of the deposited money is associated as a pre-deposit amount. The POS register 20 reads the pre-deposit amount from the pre-deposit receipt RC and performs a checkout process, and dispenses change according to need. In this configuration, the cashier B at the manned checkout counter R1 does not have to receive money from the customer A and insert the money in the change machine 30. Thus, a speedy and efficient checkout process is realized.

Figure 2:
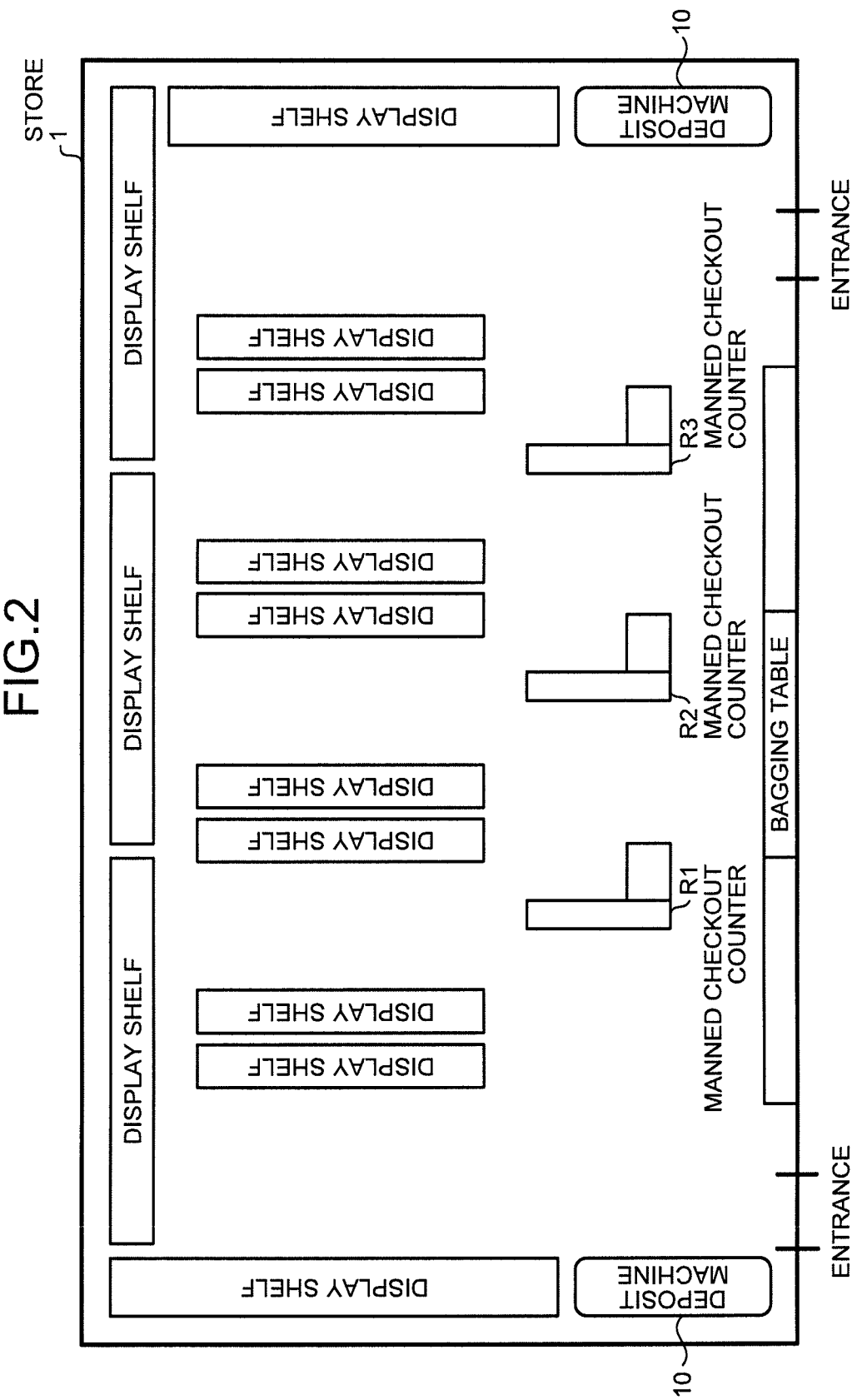
FIG. 2 shows a specific example of a layout of a store.

Next, a specific example of a layout of a store will be described. FIG. 2 shows the specific example of the layout of the store. The store 1 shown in FIG. 2 has two entrances. Near each entrance, a deposit machine 10 is installed. In the store 1, a plurality of display shelves, three manned checkout counters R1 to R3, and tables for bagging of commodities after checkout, are arranged.

In the store 1 shown in FIG. 2, a customer flow line is formed such that a customer, who has entered the store, first performs pre-deposit with the deposit machine 10, picks up desired commodities from the display shelves, performs checkout at any of the manned checkout counters R1 to R3, bags the commodities at the bagging table, and leaves the store. Causing each customer to perform pre-deposit first can effectively avoid occurrence of waiting queues at the manned checkout counters R1 to R3.

<Configuration and Operation of Deposit Machine 10>

Figure 3:
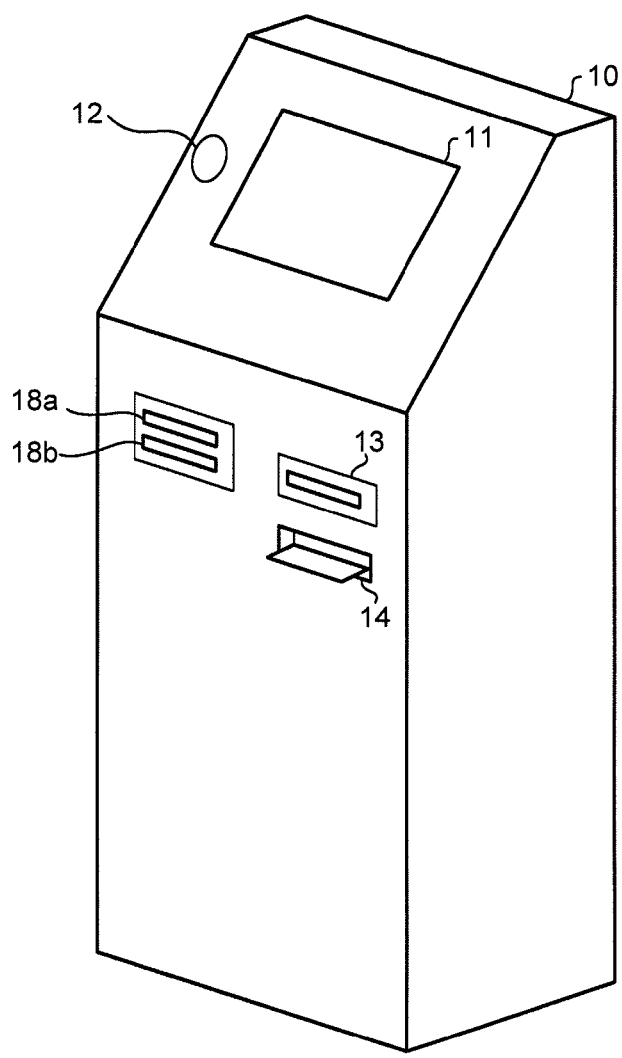
FIG. 3 shows an external configuration of a deposit machine.

The external configuration of the deposit machine 10 will be described. FIG. 3 shows the external configuration of the deposit machine 10. As shown in FIG. 3, the deposit machine 10 includes a display operation unit 11, an audio output unit 12, a card reader 13, a receipt printer 14, a banknote inlet 18*a*, and a banknote outlet 18*b*. While the deposit machine 10 of the present embodiment handles banknotes, the deposit machine 10 can be configured to handle both banknotes and coins.

The display operation unit 11 is an input/output unit such as a touch panel display. The display operation unit 11 performs output display of a screen. In addition, the display operation unit 11 receives an input operation through buttons and the like displayed on the screen. The audio output unit 12 is an output unit which outputs an operation guidance, a caution message, etc., by voice.

The card reader 13 reads various kinds of information from a point card, etc. The receipt printer 14 is used for, for example, issuing a pre-deposit receipt RC. The banknote inlet 18a is used for inserting banknotes for pre-deposit. The banknote outlet 18b is used for dispensing of banknotes. For example, when only part of the amount of inserted banknotes is received as a pre-deposit amount, banknotes corresponding to a difference between the inserted amount and the received amount are dispensed for returning to a customer. Likewise, banknotes are dispensed also when inserted banknotes are returned due to cancellation of pre-deposit or when inserted banknotes are inappropriate banknotes, such as banknotes whose denominations cannot be recognized.

A description will be given of the case where only part of the amount of inserted banknotes is a pre-deposit amount. For example, when a customer only has a large-denomination banknote such as a 10,000-yen note, it is conceivable that the customer may want to pre-deposit not all the amount of an inserted banknote but only part of the amount. Therefore, the deposit machine 10 causes the display operation unit 11 to display monetary amount selection buttons such as "all", "10,000 yen", "5,000 yen", "3,000 yen", "1,000 yen", etc. When the amount of the inserted banknote exceeds the monetary amount selected through the monetary amount selection buttons, the deposit machine 10 returns banknotes corresponding to a difference between the amounts. Thus, the customer can pre-deposit a desired amount of money.

Figure 4:
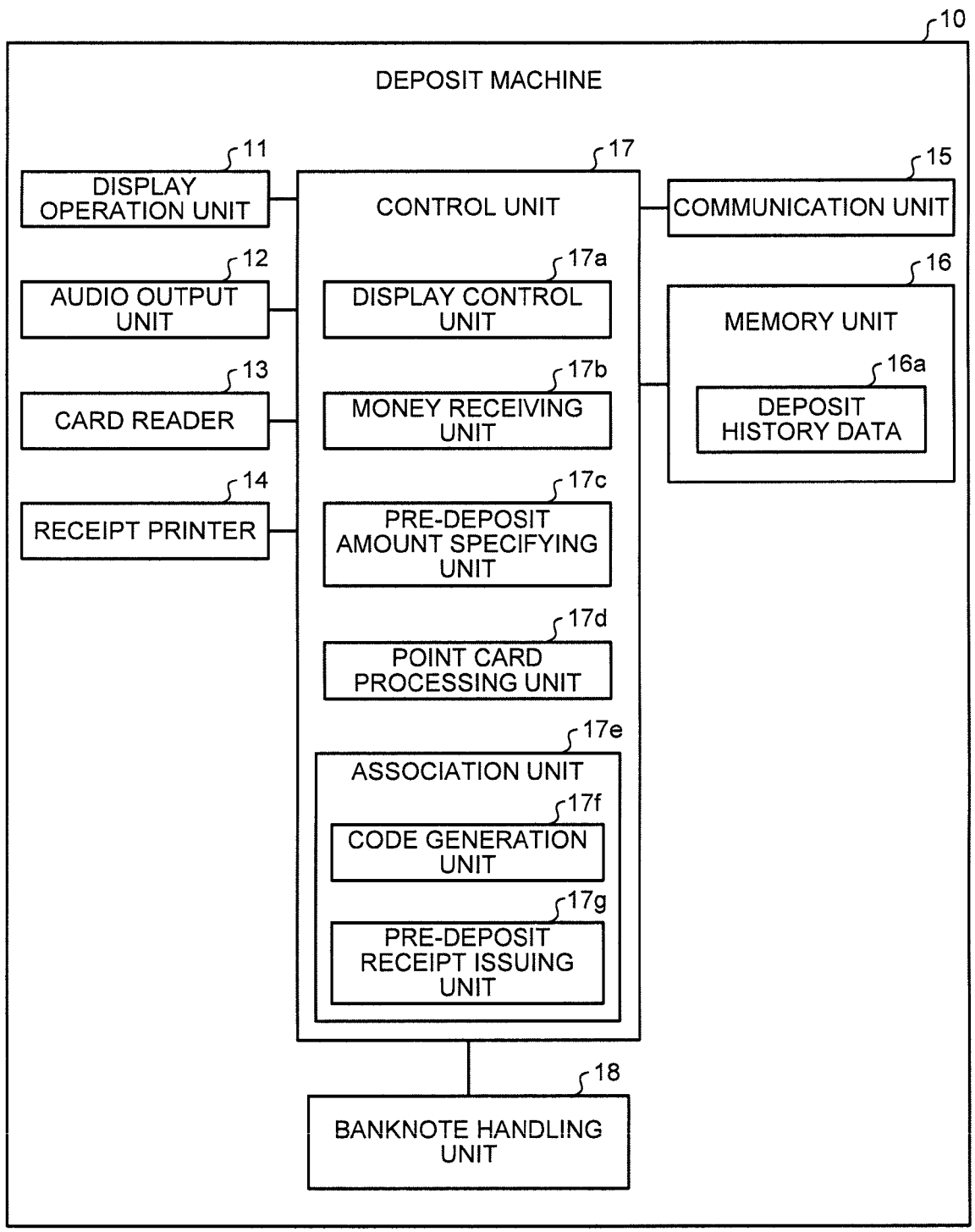
FIG. 4 is a functional block diagram showing an internal configuration of the deposit machine shown in FIG. 3.

Next, the internal configuration of the deposit machine 10 shown in FIG. 3 will be described. FIG. 4 is a functional block diagram showing the internal configuration of the deposit machine 10 shown in FIG. 3. As shown in FIG. 4, the deposit machine 10 includes the display operation unit 11, the audio output unit 12, the card reader 13, the receipt printer 14, a communication unit 15, a memory unit 16, a control unit 17, and a banknote handling unit 18. The display operation unit 11, the audio output unit 12, the card reader 13, and the receipt printer 14, which have already been described, will not be repeatedly described. The banknote handling unit 18 in which banknotes are stored for each denomination will be described later in detail.

The communication unit 15 is an interface for communication with a management device, etc., installed in the store, via a predetermined communication network. The memory unit 16 is a storage device implemented by, for example, a nonvolatile memory such as a flash memory, or a secondary storage such as a hard disk drive. The memory unit 16 stores therein deposit history data 16a.

The deposit history data 16a is data indicating the history of deposit of money into the deposit machine 10. The deposit history data 16a includes, for example, date and time of deposit, an amount of deposit, and identification number of issued pre-deposit receipt RC. If reading of a point card has been performed, identification information (ID) of the point card and the like is stored in association with the above data.

The control unit 17 controls the entirety of the deposit machine 10. The control unit 17 includes a display control unit 17a, a money receiving unit 17b, a pre-deposit amount specifying unit 17c, a point card processing unit 17d, and an association unit 17e.

The display control unit 17a controls the content to be displayed on the display operation unit 11. For example, the display control unit 17a controls the display operation unit 11 to display monetary amount selection buttons such as "all", "10,000 yen", "5,000 yen", "3,000 yen", "1,000 yen", etc. When money has been received by the money receiving unit 17b and a pre-deposit amount has been specified by the pre-deposit amount specifying unit 17c, the display control unit 17a controls the display operation unit 11 to display the result of the pre-deposit.

The money receiving unit 17b receives money inserted in the banknote inlet 18a. Specifically, the money receiving unit 17b is notified of the denominations and the number of pieces of the inserted money from the banknote handling unit 18, and specifies the total amount of money, as an amount of inserted money.

The pre-deposit amount specifying unit 17c specifies a pre-deposit amount. Specifically, when the amount of inserted money is equal to or more than a monetary amount designated through an operation of pressing the monetary amount selection button, the pre-deposit amount specifying unit 17c specifies, as a pre-deposit amount, the monetary amount corresponding to the monetary amount selection button. When the amount of inserted money exceeds the pre-deposit amount, banknotes corresponding to a difference between the amounts are dispensed from the banknote handling unit 18.

When a point card is inserted in the card reader 13, the point card processing unit 17d reads an ID (identification information), a point balance, etc., from the inserted point card.

The association unit 17e associates a negotiable value corresponding to the pre-deposit amount with a predetermined medium used for checkout for commodities. The association unit 17e includes a code generation unit 17f and a pre-deposit receipt issuing unit 17g.

The code generation unit 17f generates a code of the negotiable value corresponding to the pre-deposit amount. The POS register 20 is provided with a barcode reader for reading barcodes attached to commodities. Therefore, the code generated by the code generation unit 17f is preferably a barcode. However, the code may be a code of another form, such as a two-dimensional barcode. When the point card processing unit 17d has read an ID and a point balance from a point card, the code generation unit 17f also generates codes of the ID and the point balance of the point card.

The pre-deposit receipt issuing unit 17g functions as a printing unit which causes the receipt printer 14 to print the codes generated by the code generation unit 17f. In addition, the pre-deposit receipt issuing unit 17g functions as a receipt issuing unit which issues a pre-deposit receipt RC on which the codes are printed. The codes indicating the pre-deposit amount, the ID of the point card, etc., are printed on the pre-deposit receipt RC. Additionally, a character string indicating a pre-deposit amount, date of issuance, expiration date, identification information of the pre-deposit receipt RC itself, an ID of a point card, etc., may be printed on the pre-deposit receipt RC.

When issuing the pre-deposit receipt RC, the pre-deposit receipt issuing unit 17g updates the deposit history data 16a. Specifically, the pre-deposit receipt issuing unit 17g registers, on the deposit history data 16a, date and time of deposit, an amount of deposit, and an identification number of the issued pre-deposit receipt RC, etc. When reading of a point card has been performed, information such as the ID of the point card is also registered in association with the above registered information.

Figure 5:
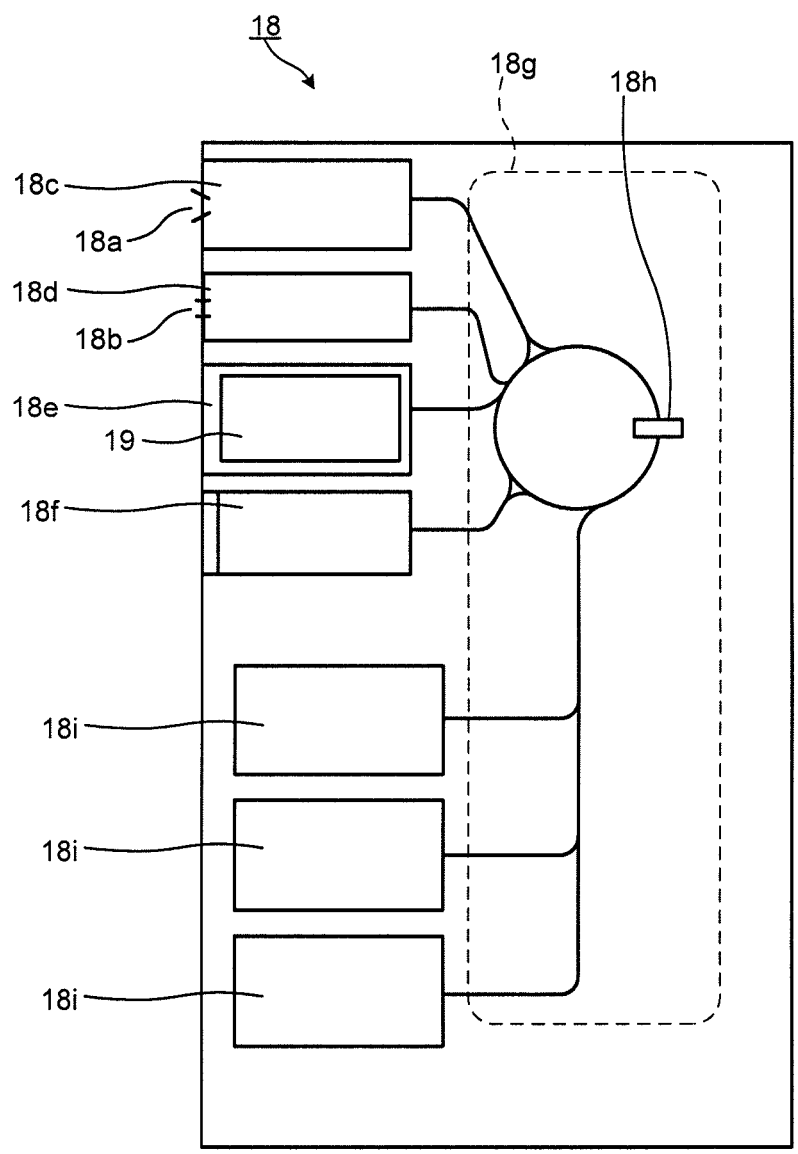
FIG. 5 shows a configuration of a banknote handling unit.

Next, the banknote handling unit 18 will be described in detail. FIG. 5 illustrates the configuration of the banknote handling unit 18. As shown in FIG. 5, the banknote handling unit 18 includes a banknote receiving unit 18c, a banknote dispensing unit 18d, a cassette mounting unit 18e, a dispensing reject unit 18f, a rotary transport unit 18g, a banknote recognition unit 18h, and a plurality of banknote storing units 18i for storing therein banknotes by denomination.

The banknote receiving unit 18c receives banknotes inserted through the banknote inlet 18a. The banknote receiving unit 18c feeds the received banknotes one by one to the rotary transport unit 18g. The banknote dispensing unit 18d temporarily stores therein when the banknotes are transported one by one from the rotary transport unit 18g. The banknote dispensing unit 18d, when all banknotes to be dispensed are stored therein, discharges the stored banknotes from the banknote outlet 18b to dispense these banknotes.

The cassette mounting unit 18e is configured such that a storage cassette 19, which is used for collection of proceeds and replenishment of change, is detachably mounted thereto. The dispensing reject unit 18f stores therein a banknote which is not appropriate to be dispensed, such as a banknote whose denomination cannot be recognized. For example, when there is a banknote, which cannot be recognized by the banknote recognition unit 18h due to abnormal transport such as overlapping or skew, among banknotes fed out from the banknote storing unit 18i in a dispensing process, this banknote is transported to the dispensing reject unit 18f. Meanwhile, when there is a banknote, which cannot be recognized by the banknote recognition unit 18h due to stain or the like, among banknotes fed from the banknote receiving unit 18c in a depositing process, this banknote is returned to the banknote dispensing unit 18d as a rejected banknote in the depositing process.

The plurality of banknote storing units 18i are assigned corresponding denominations, respectively. Each banknote storing unit 18i stores therein banknotes of the assigned denomination, and is able to feed the stored banknotes one by one.

The rotary transport unit 18g includes an annular rotary transport path. A connection transport path is disposed between the rotary transport path and each of the banknote receiving unit 18c, the banknote dispensing unit 18d, the cassette mounting unit 18e, the dispensing reject unit 18f, and the plurality of banknote storing units 18i. The rotary transport path is provided with the banknote recognition unit 18h which performs recognition of a denomination, authentication, fitness, face/back orientation, transport state, and the like for each banknote.

The rotary transport unit 18g drives the rotary transport path to rotate in both the clockwise direction and the counterclockwise direction in FIG. 5, thereby transporting banknotes one by one. When storing banknotes in the banknote storing units 18i, the rotary transport path is driven to rotate clockwise in FIG. 5. When feeding banknotes from the banknote storing units 18i, the rotary transport path is driven to rotate counterclockwise in FIG. 5. In addition to the rotation drive control, the rotary transport unit 18g controls the destination of banknotes by switching the banknote transport path between the rotary transport path and each connection transport path.

Figure 6:
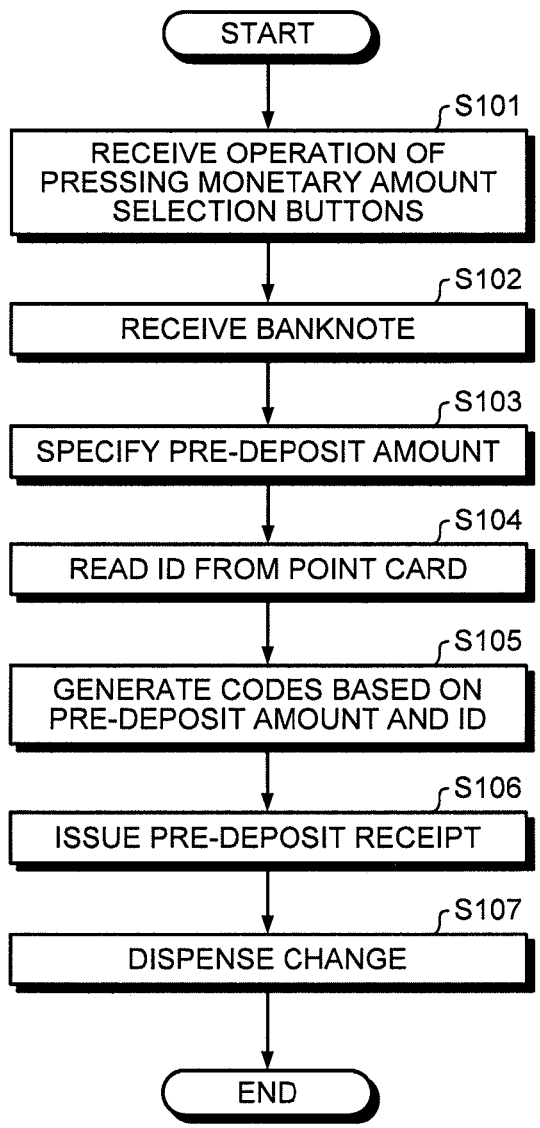
FIG. 6 is a flowchart showing a process procedure performed by the deposit machine.

Next, a process procedure performed by the deposit machine 10 will be described. FIG. 6 is a flowchart showing the process procedure performed by the deposit machine 10. When the deposit machine 10 receives an operation of pressing the monetary amount selection buttons displayed on the display operation unit 11 (step S101) and receives insertion of banknotes (step S102), the pre-deposit amount specifying unit 17c specifies a pre-deposit amount (step S103). When a point card is inserted in the card reader 13, the point card processing unit 17d obtains an ID from the point card (step S104). The timing to obtain the ID from the point card is an example, and is not limited to the timing after step S103. For example, the ID may be obtained from the point card in a stage prior to step S101.

The code generation unit 17f of the association unit 17e generates codes based on the pre-deposit amount and the ID (step S105). The pre-deposit receipt issuing unit 17g causes the receipt printer 14 to print the generated codes, thereby issuing a pre-deposit receipt (step S106). If the amount of the inserted banknotes exceeds the pre-deposit amount, the deposit machine 10 dispenses, as change, money corresponding to a difference between the amounts (step S107) to end the process.

<Configurations and Operations of POS Register 20 and Change Machine 30>

Figure 7:
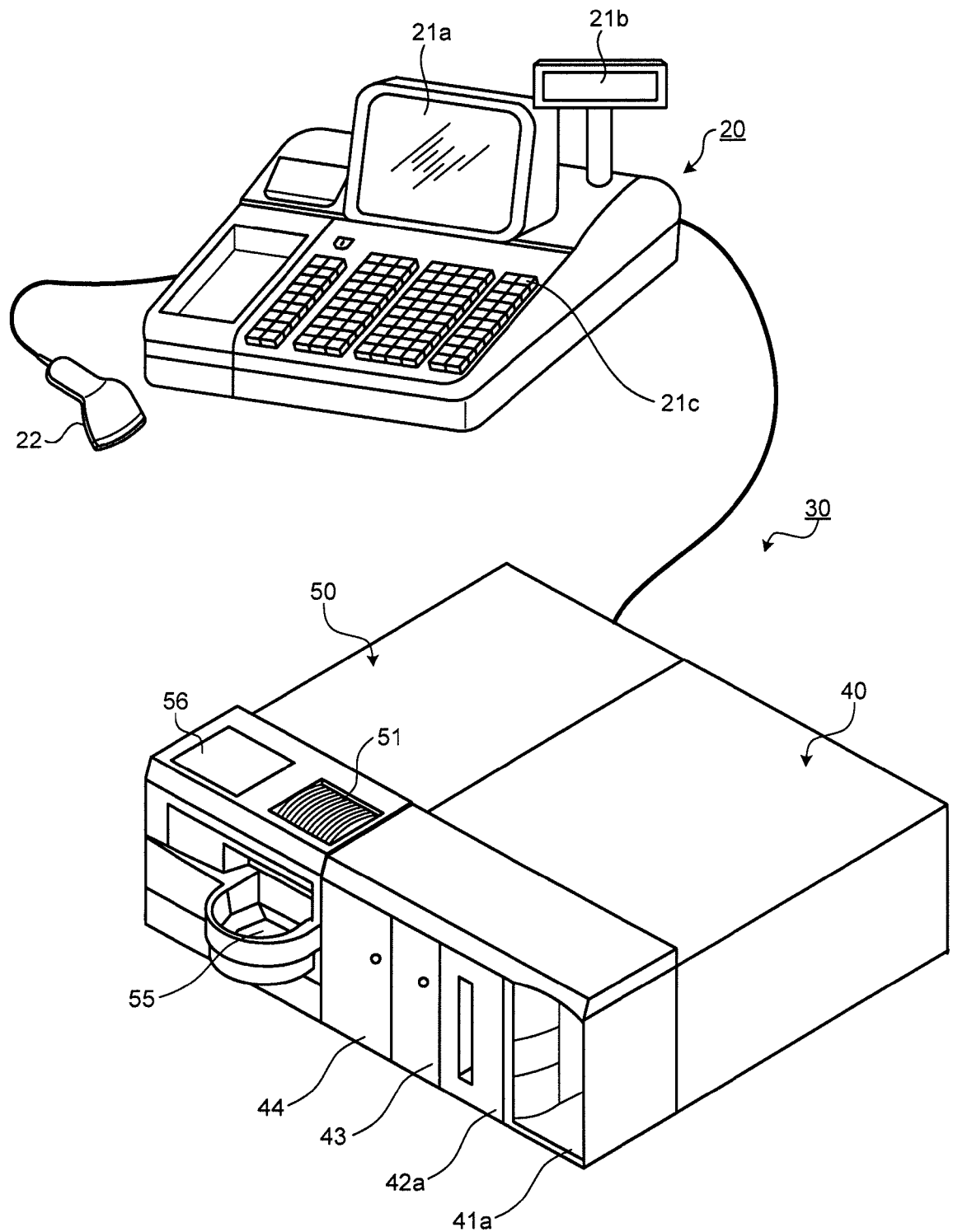
FIG. 7 shows external configurations of a POS register and a change machine.

The configurations of the POS register 20 and the change machine 30 installed on a manned checkout counter will be described. FIG. 7 illustrates the external configurations of the POS register 20 and the change machine 30. As shown in FIG. 7, the POS register 20 includes an operator display 21a, a customer display 21b, an operation unit 21c such as an operation key, and a barcode reader 22.

The change machine 30 includes a banknote handling unit 40, and a coin handling unit 50 disposed adjacent to the banknote handling unit 40. The POS register 20 can be disposed on the banknote handling unit 40 and the coin handling unit 50.

The banknote handling unit 40 performs depositing and dispensing of banknotes. The banknote handling unit 40 includes a banknote inlet 41a and a banknote outlet 42a. The banknote handling unit 40 includes a dispensing reject unit 43 and a cassette mounting unit 44 which are described later.

The coin handling unit 50 performs depositing and dispensing of coins. The coin handling unit 50 includes a coin inlet 51 and a coin outlet 55. The coin handling unit 50 is provided with a display operation unit 56 of the change machine 30.

Figure 8:
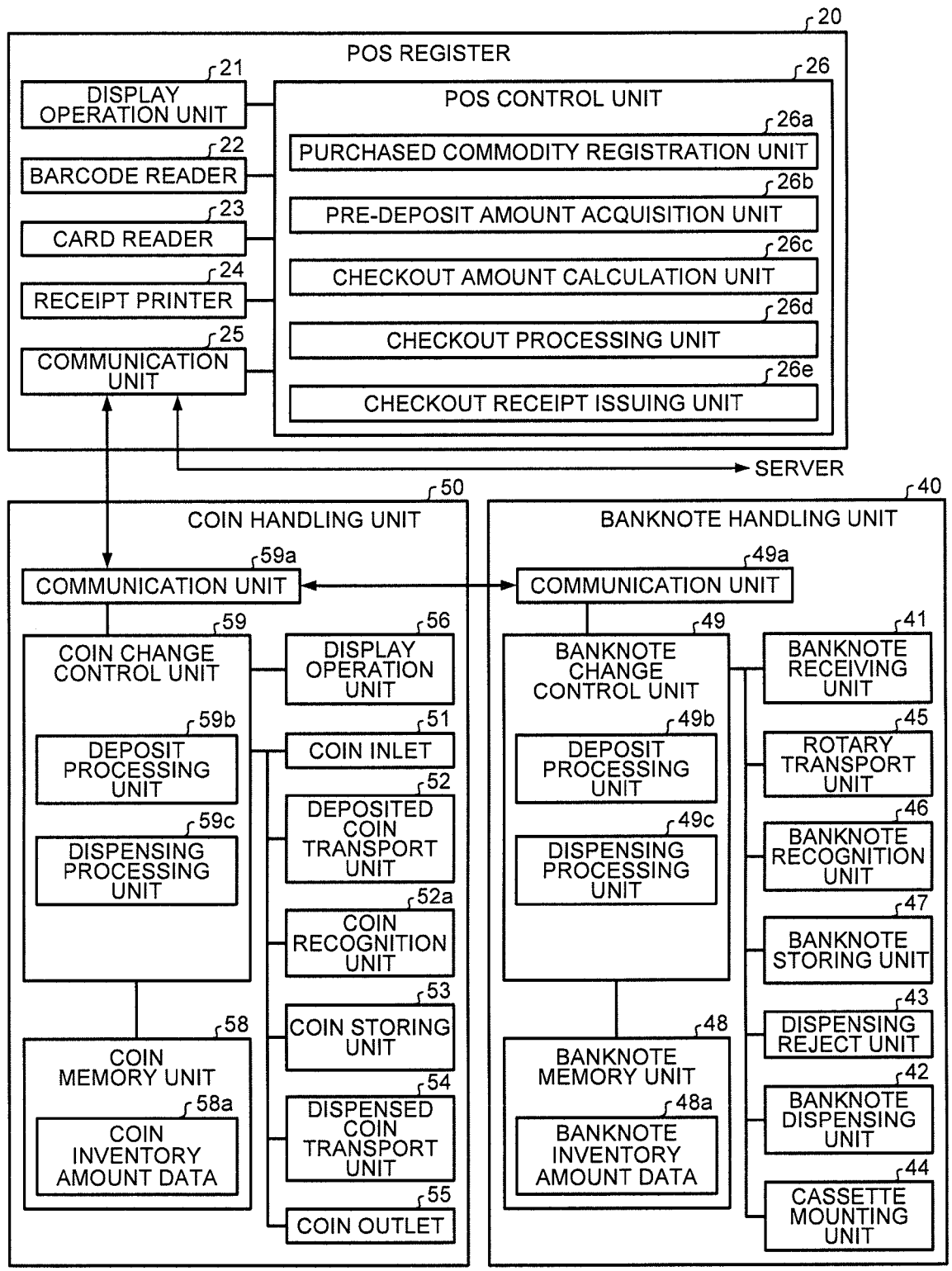
FIG. 8 is a functional block diagram showing functional configurations of the POS register and the change machine.

FIG. 8 is a functional block diagram showing functional configurations of the POS register 20 and the change machine 30. As shown in FIG. 8, the POS register 20 includes a display operation unit 21, the barcode reader 22, a card reader 23, a receipt printer 24, a communication unit 25, and a POS control unit 26.

The display operation unit 21 outputs information to an operator and a customer, and receives an input performed by the operator, through the display 21a, the display 21b, and the operation unit 21c. The barcode reader 22 is used for reading barcodes attached to commodities. Information such as the names, prices, etc., of the commodities can be obtained by the barcode reader 22. The barcode reader 22 is also used for reading codes from pre-deposit receipts. The card reader 23 is used for checkout with a payment card such as a credit card, a debit card, a prepaid card, etc.

The receipt printer 24 is used for issuing a checkout receipt on which the content of transaction is printed. The content of transaction printed on the checkout receipt includes, for example, date and time, names and prices of registered commodities, an amount of inserted money, a pre-deposit amount, an amount of change, and a point balance. The communication unit 25 is a communication interface for communication with the change machine 30 and an external server.

The POS control unit 26 controls the entirety of the POS register 20. The POS control unit 26 includes a purchased commodity registration unit 26a, a pre-deposit amount acquisition unit 26b, a checkout amount calculation unit 26c, a checkout processing unit 26d, and a checkout receipt issuing unit 26e.

The purchased commodity registration unit 26a performs registration of commodities to be purchased. Specifically, when the barcode reader 22 reads a barcode attached to a commodity to acquire the name, price, etc., of the commodity, the purchased commodity registration unit 26a performs registration of the commodity by using the acquired information, and displays information on the registered commodity on the display 21a or the like.

The pre-deposit amount acquisition unit 26b reads a code printed on the pre-deposit receipt, through the barcode reader 22, and acquires a pre-deposit amount. When an ID of a point card is included in the code printed on the pre-deposit receipt, the pre-deposit amount acquisition unit 26b further acquires the ID of the point card.

The checkout amount calculation unit 26c sums up the prices of all the commodities registered by the purchased commodity registration unit 26a to calculate a checkout amount, and displays the checkout amount on the display 21a or the like.

The checkout processing unit 26d performs a checkout process in which settlement for the checkout amount calculated by the checkout amount calculation unit 26c is performed to complete the transaction. The settlement of the checkout amount can be made using the pre-deposit amount. In the checkout process using the pre-deposit amount, if the pre-deposit amount is insufficient, the checkout processing unit 26d receives additional deposit of money to the change machine 30 from the customer, adds the amount of the additional deposit to the pre-deposit amount, and continues the checkout process. If the pre-deposit amount exceeds the checkout amount in the checkout process using the pre-deposit amount, the checkout processing unit 26d causes the change machine 30 to dispense, as change, money corresponding to a difference between the pre-deposit amount and the checkout amount.

The checkout process may be performed by using a payment card or cash. When settlement using a payment card is selected, the checkout processing unit 26d acquires information such as a card ID from the payment card inserted in the card reader 23, and transmits the information together with the checkout amount to an external server, thereby performing the settlement. When settlement by cash is selected, the checkout processing unit 26d transmits the checkout amount to the change machine 30, thereby performing the settlement, and completes the settlement upon receiving checkout completion notification from the change machine 30.

Upon completion of the checkout process, the checkout receipt issuing unit 26e issues a checkout receipt by using the receipt printer 24. On the checkout receipt, as described above, date and time, names and prices of registered commodities, an amount of inserted money, a pre-deposit amount, an amount of change, a point balance, etc., are printed.

The change machine 30 is composed of the banknote handling unit 40 and the coin handling unit 50. The banknote handling unit 40 stores therein banknotes by denomination. The coin handling unit 50 stores therein coins by denomination.

The banknote handling unit 40 includes a communication unit 49a, a banknote receiving unit 41, a rotary transport unit 45, a banknote recognition unit 46, a banknote storing unit 47, the dispensing reject unit 43, a banknote dispensing unit 42, a cassette mounting unit 44, a banknote memory unit 48, and a banknote change control unit 49. The communication unit 49a is an interface for data communication with the coin handling unit 50 via a communication line. The banknote handling unit 40 is not connected to the POS register 20 directly by a communication line, but is able to communicate with the POS register 20 via the coin handling unit 50.

The banknote memory unit 48 is a storage device implemented by, for example, a nonvolatile memory such as a flash memory, or a secondary storage such as a hard disk drive. The banknote memory unit 48 stores therein banknote inventory amount data 48a, etc. The banknote inventory amount data 48a indicates the inventory amounts, for each denomination, of the banknotes stored in the banknote handling unit 40.

The banknote change control unit 49 controls the banknote handling unit 40. The banknote change control unit 49 includes a deposit processing unit 49b and a dispensing processing unit 49c.

The deposit processing unit 49b performs depositing of banknotes. The deposit processing unit 49b allows insertion of banknotes to the banknote handling unit 40 when receiving a checkout amount from the POS register 20 or when receiving an instruction to receive additional deposit.

Thereafter, the deposit processing unit 49b acquires the number of banknotes, for each denomination, inserted in the banknote handling unit 40. The deposit processing unit 49b calculates the total amount of the inserted banknotes, and transmits the total amount to the POS register 20 via the communication unit 59a of the coin handling unit 50.

The dispensing processing unit 49c performs dispensing of banknotes. The dispensing processing unit 49c receives a dispensing instruction for dispensing change banknotes, from the POS register 20 via the communication unit 59a of the coin handling unit 50. Upon receiving the dispensing instruction, the dispensing processing unit 49c determines the number and denominations of banknotes to be dispensed, in accordance with the amount of change, and performs dispensing of banknotes based on the determination. When dispensing of the change is successfully completed, the dispensing processing unit 49c notifies the POS register 20 of the completion via the communication unit 59a of the coin handling unit 50.

The coin handling unit 50 includes the communication unit 59a, the coin inlet 51, a deposited coin transport unit 52, a coin recognition unit 52a, a coin storing unit 53, a dispensed coin transport unit 54, the coin outlet 55, the display operation unit 56, a coin memory unit 58, and a coin change control unit 59. The communication unit 59a is an interface for data communication with the POS register 20 and the banknote handling unit 40 via a communication line.

The coin memory unit 58 is a storage device implemented by, for example, a nonvolatile memory such as a flash memory, or a secondary storage such as a hard disk drive. The coin memory unit 58 stores therein coin inventory amount data 58a, etc. The coin inventory amount data 58a indicates the inventory amounts, for each denomination, of the coins stored in the coin handling unit 50.

The coin change control unit 59 controls the coin handling unit 50. The coin change control unit 59 includes a deposit processing unit 59b and a dispensing processing unit 59c.

The deposit processing unit 59b performs depositing of coins. The deposit processing unit 59b allows insertion of coins to the coin handling unit 50 when receiving a checkout amount from the POS register 20 or when receiving an instruction to receive additional deposit.

Thereafter, the deposit processing unit 59b acquires the number of coins, for each denomination, inserted in the coin handling unit 50. The deposit processing unit 59b calculates the total amount of the inserted coins, and transmits the total amount to the POS register 20.

The dispensing processing unit 59c performs dispensing of coins. The dispensing processing unit 59c receives a dispensing instruction for dispensing change coins, from the POS register 20. Upon receiving the dispensing instruction, the dispensing processing unit 59c determines the number and denominations of coins to be dispensed, in accordance with the amount of change, and performs dispensing of coins based on the determination. When dispensing of the change is successfully completed, the dispensing processing unit 59c notifies the POS register 20 of the completion.

Figure 9:
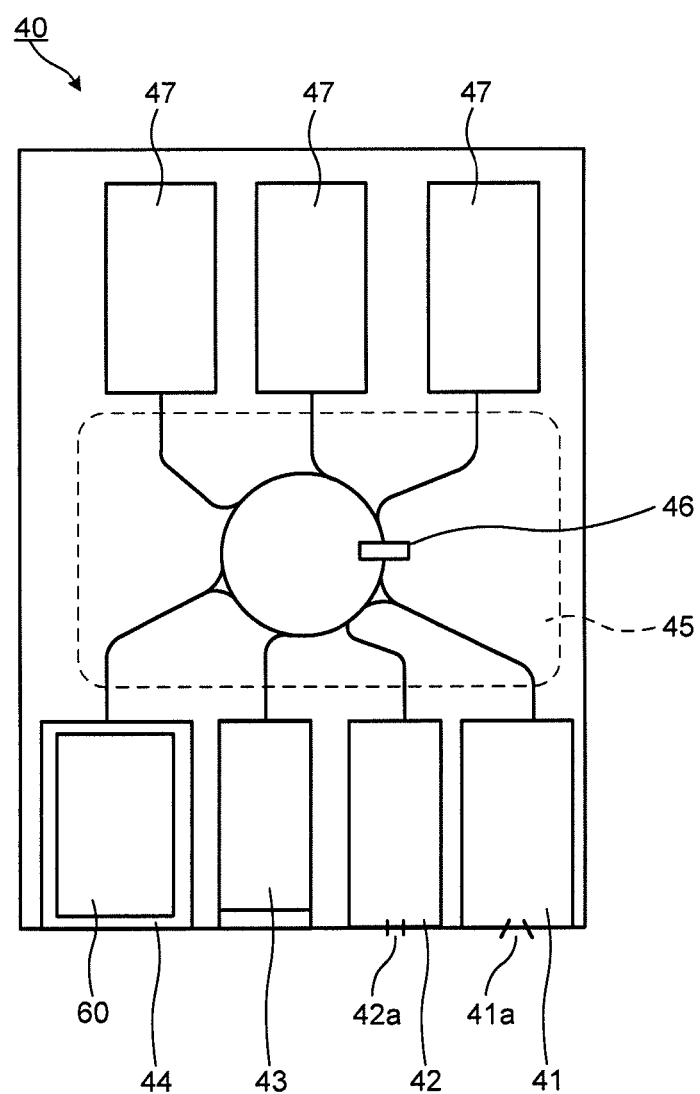
FIG. 9 shows a configuration of a banknote handling unit.

Next, the banknote handling unit 40 and the coin handling unit 50 will be described in detail. FIG. 9 illustrates the configuration of the banknote handling unit 40. As shown in FIG. 9, the banknote handling unit 40 includes the banknote receiving unit 41, the banknote dispensing unit 42, the dispensing reject unit 43, the cassette mounting unit 44, the rotary transport unit 45, the banknote recognition unit 46, and the banknote storing units 47 for each denomination.

The banknote receiving unit 41 receives banknotes inserted through the banknote inlet 41a. The banknote receiving unit 41 feeds the received banknotes one by one to the rotary transport unit 45. The banknote dispensing unit 42 temporarily stores therein when the banknotes are transported one by one from the rotary transport unit 45. The banknote dispensing unit 42, when all banknotes to be dispensed are stored therein, discharges the stored banknotes from the banknote outlet 42a to dispense these banknotes.

The dispensing reject unit 43 stores therein a banknote which is not appropriate to be dispensed, such as a banknote whose denomination cannot be recognized. For example, when there is a banknote, which cannot be recognized by the banknote recognition unit 46 due to abnormal transport such as overlapping or skew, among the banknotes fed from the banknote storing unit 47 in a dispensing process, this banknote is transported to the dispensing reject unit 43. Meanwhile, when there is a banknote, which cannot be recognized by the banknote recognition unit 46 due to stain or the like, among banknotes fed from the banknote receiving unit 41 in a depositing process, this banknote is returned to the banknote dispensing unit 42 as a rejected banknote in the depositing process.

The cassette mounting unit 44 is configured such that a banknote cassette 60 which is used for collection of proceeds and replenishment of change, is detachably mounted thereto.

The plurality of banknote storing units 47 are assigned corresponding denominations, respectively. Each banknote storing unit 47 stores therein banknotes of the assigned denomination, and is able to feed the stored banknotes one by one.

The rotary transport unit 45 includes a rotary transport path in the center thereof. A connection transport path is disposed between the rotary transport path and each of the banknote receiving unit 41, the banknote dispensing unit 42, the dispensing reject unit 43, the cassette mounting unit 44, and the plurality of banknote storing units 47. The rotary transport path is provided with the banknote recognition unit 46 which preforms recognition of a denomination, authentication, fitness, face/back orientation, transport state, and the like for each banknote.

The rotary transport unit 45 drives the rotary transport path to rotate in both the clockwise direction and the counterclockwise direction in FIG. 9, thereby transporting banknotes one by one. When storing banknotes in the banknote storing units 47, the rotary transport path is driven to rotate clockwise in FIG. 9. When feeding banknotes from the banknote storing units 47, the rotary transport path is driven to rotate counterclockwise in FIG. 9. In addition to the rotation drive control, the rotary transport unit 45 controls the destination of banknotes by switching the banknote transport path between the rotary transport path and each of the connection transport paths.

Figure 10:
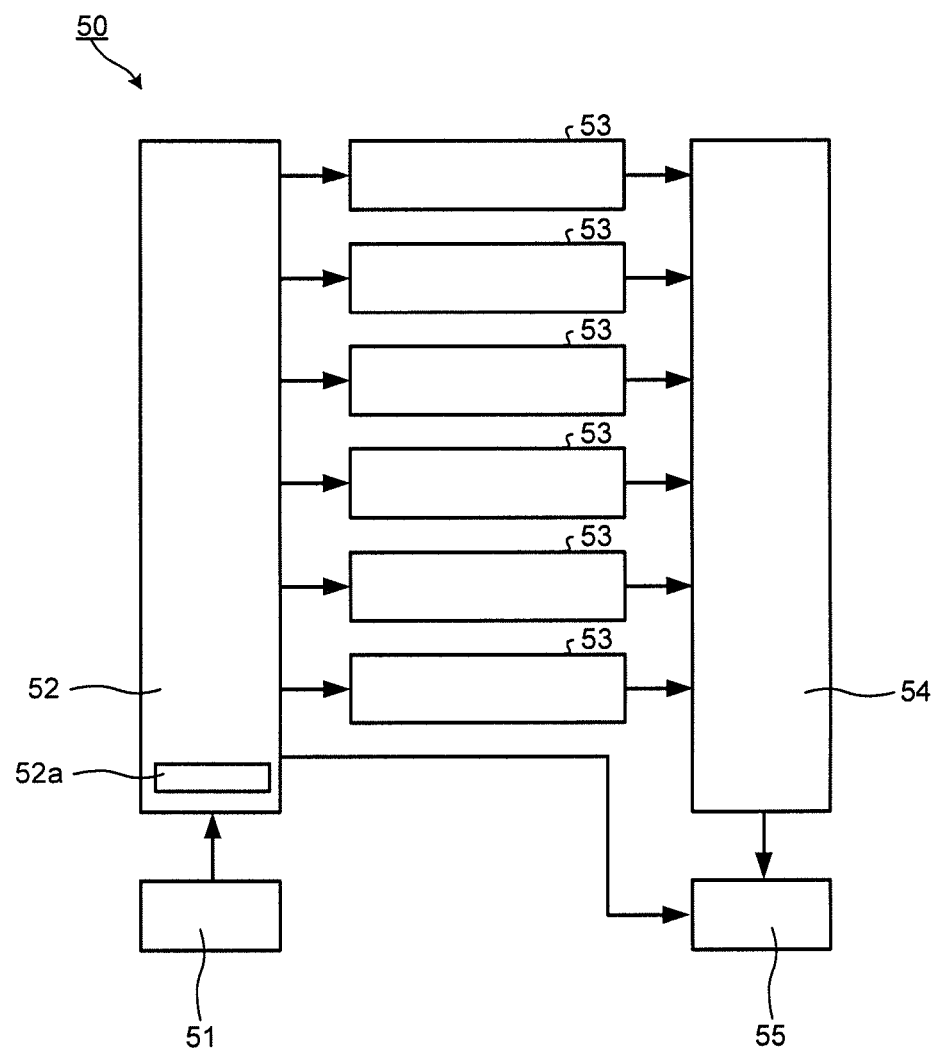
FIG. 10 shows a configuration of a coin handling unit.

FIG. 10 illustrates the configuration of the coin handling unit 50. As shown in FIG. 10, the coin handling unit 50 includes the coin inlet 51, the deposited coin transport unit 52, the coin storing units 53 for each denomination, the dispensed coin transport unit 54, and the coin outlet 55. The deposited coin transport unit 52 is provided with the coin recognition unit 52a.

The deposited coin transport unit 52 takes coins inserted through the coin inlet 51, one by one, into a housing such that the coins are arranged in one layer in one line. The deposited coin transport unit 52 includes a coin feeding mechanism implemented by a feed belt or the like. When insertion of coins through the coin inlet 51 is detected, the coin feeding mechanism is driven and the coins are fed one by one.

The coin recognition unit 52a performs recognition of a denomination, authentication, fitness, face/back orientation, transport state, and the like for each coin fed to the deposited coin transport unit 52. The deposited coin transport unit 52 determines a destination of each coin, based on the recognition result of the coin recognition unit 52a. A coin not suitable to be stored in the coin storing unit 53, such as a stained coin or a coin not recognized as a genuine coin, is transported to the coin outlet 55 as a rejected coin. A coin suitable to be stored in the coin storing unit 53 is transported to the coin storing unit 53 corresponding to the recognition result of the denomination.

The plurality of coin storing units 53 are assigned corresponding denominations, respectively. Each coin storing unit 53 stores therein coins of the assigned denomination, and is able to feed the stored coins one by one to the dispensed coin transport unit 54. The dispensed coin transport unit 54 transports the coins fed from the coin storing unit 53 and dispenses the coins to the coin outlet 55.

Figure 11:
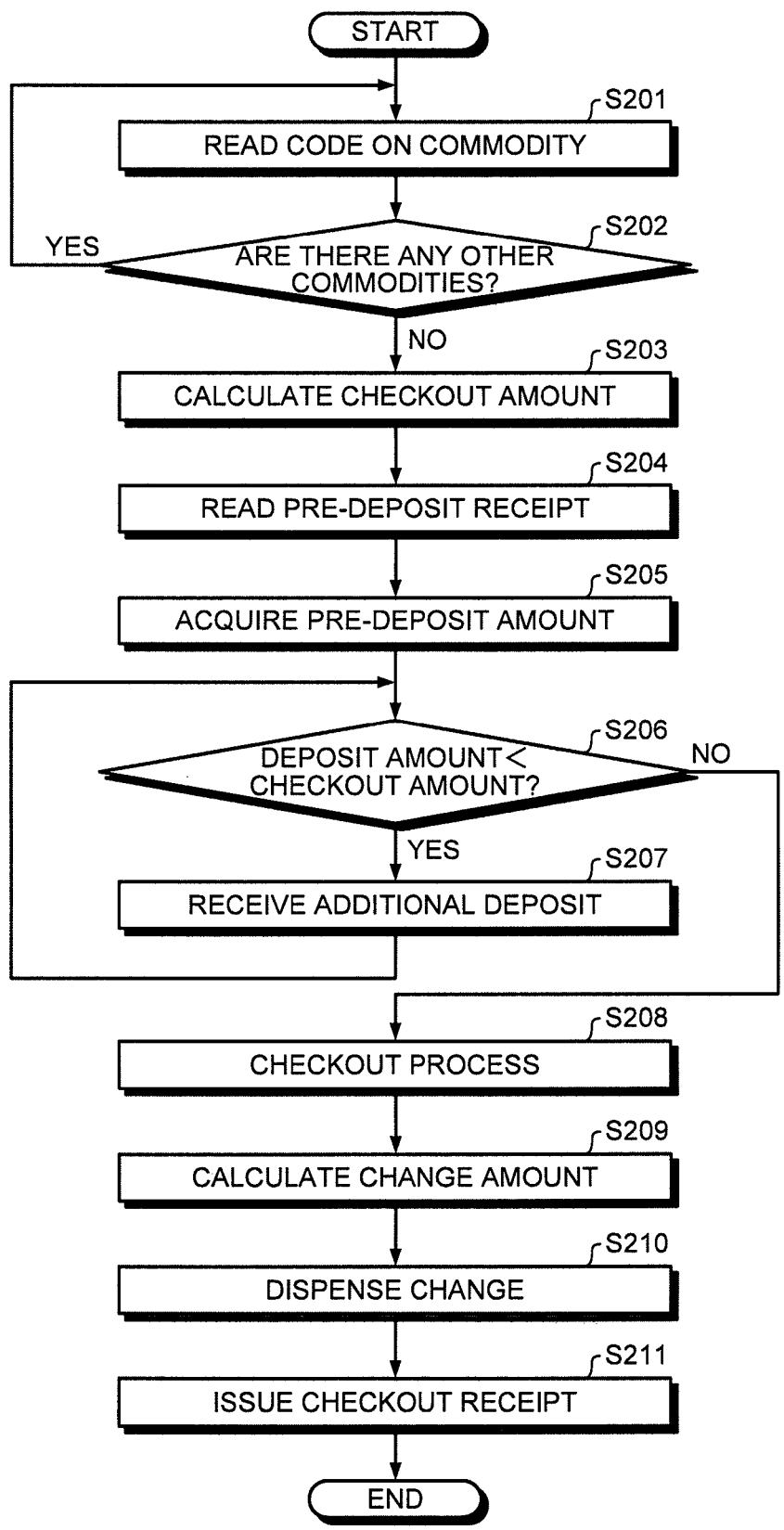
FIG. 11 is a flowchart showing a process procedure performed by the POS register.

Next, a process procedure performed by the POS register 20 will be described. FIG. 11 is a flowchart showing the process procedure performed by the POS register 20. First, the purchased commodity registration unit 26a reads a barcode attached to a commodity, through the barcode reader 22 (step S201). When there are more commodities (step S202; Yes), the purchased commodity registration unit 26a goes to step S201 and reads a barcode attached to a next commodity.

When the barcodes of all the commodities have been read (step S202; No), the checkout amount calculation unit 26c sums up the prices of all the commodities to calculate a checkout amount (step S203). The pre-deposit amount acquisition unit 26b reads a code printed on a pre-deposit receipt, through the barcode reader 22 (step S204), and acquires a pre-deposit amount (step S205).

When the pre-deposit amount is less than the checkout amount (step S206; Yes), the checkout processing unit 26d receives additional deposit of money (step S207). When the deposit amount including the pre-deposit amount and the amount of the additional deposit becomes equal to or more than the checkout amount (step S206; No), the checkout processing unit 26d performs settlement of the checkout amount to execute a checkout process (step S208). The checkout processing unit 26d calculates an amount of change (step S209), and causes the change machine 30 to dispense the change (step S210). Thereafter, the checkout receipt issuing unit 26e issues a checkout receipt by using the receipt printer 24 (step S211) to end the process.

The checkout system may be configured such that, when the checkout process is performed using a pre-deposit receipt, information that specifies the pre-deposit receipt (e.g., identification information of the pre-deposit receipt itself) is managed as information of an already-used pre-deposit receipt to prevent one pre-deposit receipt from being used multiple times. In this configuration, when the pre-deposit receipt is read in step S204, whether or not the pre-deposit receipt is valid, i.e., whether or not the pre-deposit receipt is managed as an already-used pre-deposit receipt, is determined. When the pre-deposit receipt is determined to be valid, step S205 and subsequent steps are performed. When there are a plurality of checkout counters at which the pre-deposit receipt is available, information on already-used pre-deposit receipts is managed to be shared among the checkout counters.

<Modifications>

In the above description, a pre-deposit receipt on which a pre-deposit amount is printed is issued. However, a pre-deposit amount can be associated with a medium carried by a customer. For example, as a medium with which a pre-deposit amount is associated, a medium by which an individual can be identified, such as a license or an insurance card, may be used. If identification information that can uniquely identify a mobile device is available, the mobile device can be used as such a medium.

Figure 12:
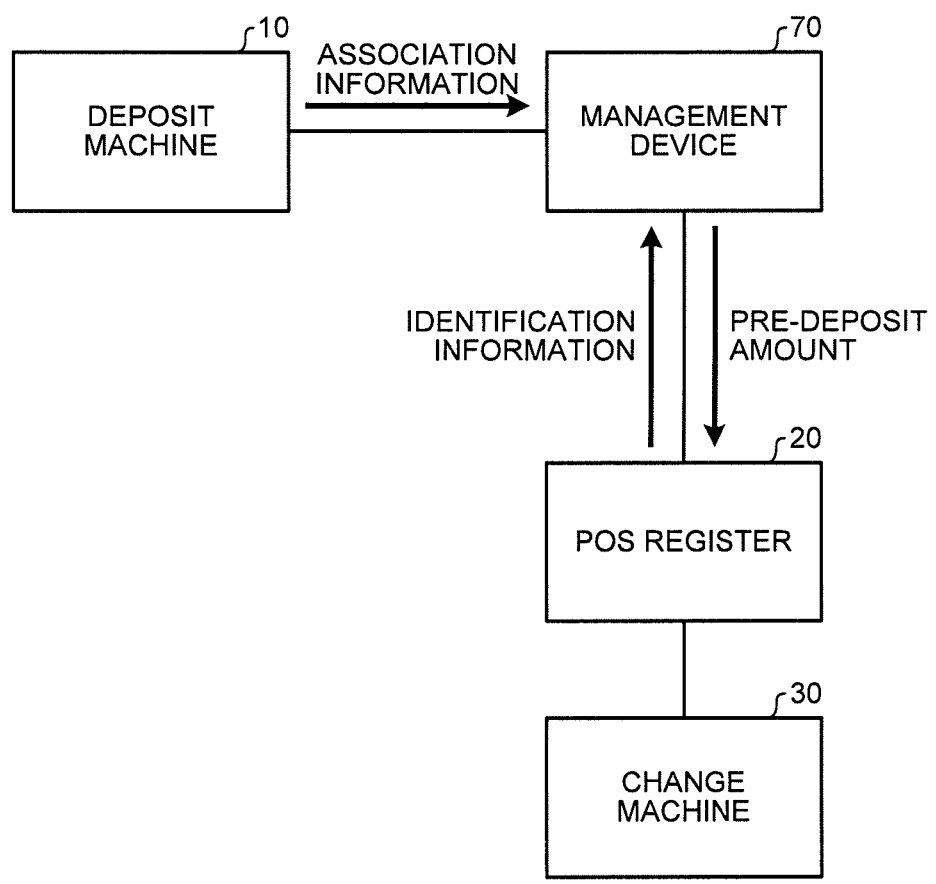
FIG. 12 shows a case where a pre-deposit amount is associated with a medium carried by a customer.

FIG. 12 shows a case where a pre-deposit amount is associated with a medium carried by a customer. In the configuration shown in FIG. 12, a deposit machine 10 and a POS register 20 are communicable with a management device 70.

The deposit machine 10 receives deposited money and specifies a pre-deposit amount. The deposit machine 10 acquires identification information from a medium with which the pre-deposit amount is to be associated, and transmits association information to the management device 70. The association information includes the acquired identification information of the medium, the pre-deposit amount, and a device ID for identifying the deposit machine 10. The management device 70 registers the association information received from the deposit machine 10 in a pre-deposit table and holds the registered information.

The POS register 20 acquires the identification information from the medium presented by the customer. When the POS register 20 transmits the acquired identification information of the medium to the management device 70, the management device 70 refers to the pre-deposit table, reads out the pre-deposit amount associated with the identification information, and transmits the pre-deposit amount to the POS register 20. The POS register 20 performs a checkout process by using the pre-deposit amount received from the management device 70. When the pre-deposit amount exceeds a checkout amount, the change machine 30 dispenses money as change.

As described above, when the pre-deposit amount is associated with the medium carried by the customer so as to be managed by the management device 70, checkout using the pre-deposit money can be performed without using a pre-deposit receipt, thereby realizing a speedy and efficient checkout process.

Figure 13:
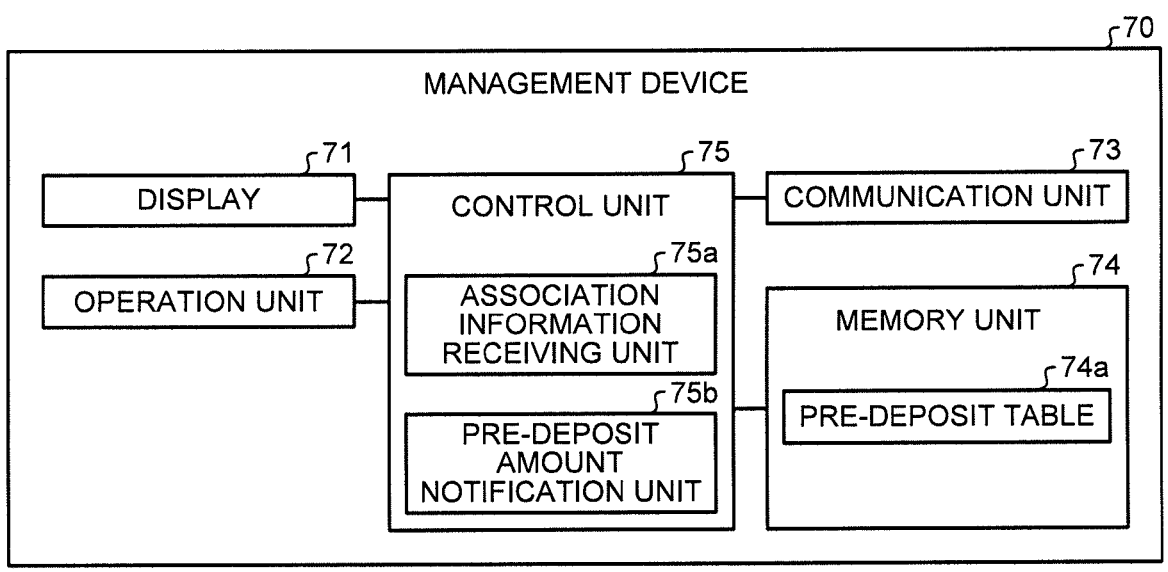
FIG. 13 is a functional block diagram showing a configuration of a management device shown in FIG. 12.

FIG. 13 is a functional block diagram showing a configuration of the management device 70 of FIG. 12. As shown in FIG. 13, the management device 70 includes a display 71, an operation unit 72, a communication unit 73, a memory unit 74, and a control unit 75.

The display 71 is composed of a display device such as a liquid crystal panel, and is used for output display to a clerk as an operator. The operation unit 72 is composed of an operation device such as a keyboard or buttons, and is used for receiving operation from the clerk as an operator. The display 71 and the operation unit 72 may be integrated with each other by using a touch panel display or the like. The communication unit 73 is a communication interface for communication with the deposit machine 10 and the POS register 20.

The memory unit 74 is a storage device composed of a hard disk drive or a nonvolatile memory. The memory unit 74 stores therein a pre-deposit table 74a. As already described above, association information received from the deposit machine 10 is registered on the pre-deposit table 74a.

The control unit 75 controls the entirety of the management device 70. The control unit 75 includes an association information receiving unit 75a and a pre-deposit amount notification unit 75b. Programs corresponding to these functional units are stored in a ROM or a nonvolatile memory which are not shown, and these programs are loaded to a CPU (Central Processing Unit) and executed, thereby causing the CPU to execute processes corresponding to the association information receiving unit 75a and the pre-deposit amount notification unit 75b.

The association information receiving unit 75a receives the association information from the deposit machine 10, and registers the received association information on the pre-deposit table 74a. When receiving the identification information of the medium from the POS register 20, the pre-deposit amount notification unit 75b refers to the pre-deposit table 74a, reads out the pre-deposit amount associated with the identification information, and notifies the POS register 20 of the pre-deposit amount.

FIG. 14 shows the pre-deposit table 74a shown in FIG. 13. In the pre-deposit table 74a shown in FIG. 14, a pre-deposit amount, date and time, type, device ID, etc., are associated with identification information of each medium. As for identification information of a medium, a license number, insurance card number, mobile IDm (identification information of a mobile device), or the like may be used. The device ID is information that identifies the deposit machine 10. Besides the above data, any data, such as a flag indicating whether or not a pre-deposit amount has already been used for checkout, point card ID, point balance, etc., can be associated with the identification information of each medium.

FIG. 14 shows a state where a pre-deposit amount of "5,000-yen", date and time of "2017/7/27, 09:03", a type of "cash", and a device ID of "T0322", etc., are associated with identification information of "A0001". Meanwhile, a pre-deposit amount of "10,000-yen", date and time of "2017/7/27, 13:27", a type of "cash", and a device ID of "T0055", etc., are associated with identification information of "B1234".

Figure 15:
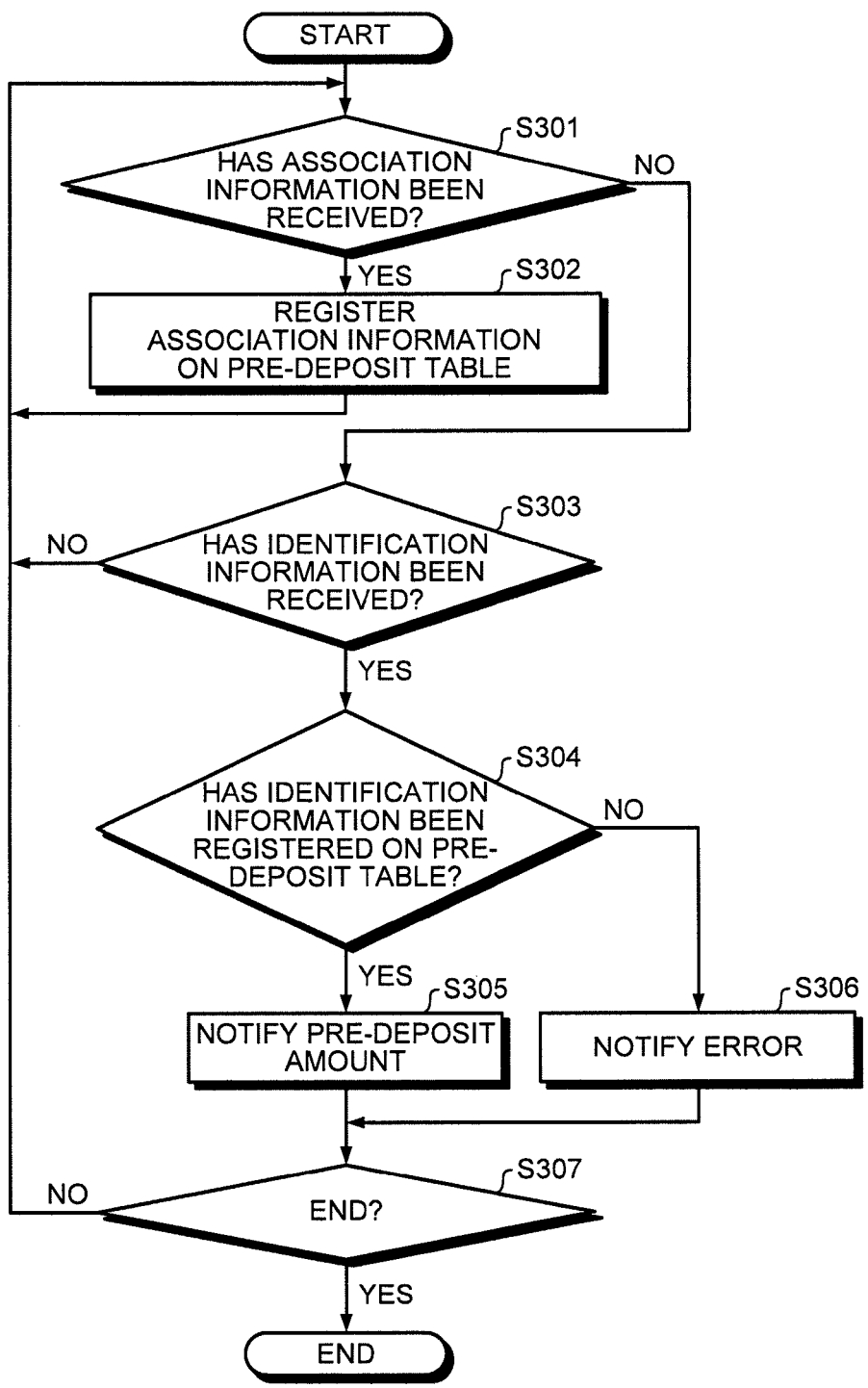
FIG. 15 is a flowchart showing a process procedure performed by the management device.

Next, a process procedure performed by the management device 70 will be described. FIG. 15 is a flowchart showing the process procedure performed by the management device 70. The association information receiving unit 75a of the management device 70 determines whether or not association information has been received from the deposit machine 10 (step S301). When association information has been received from the deposit machine 10 (step S301; Yes), the association information is registered on the pre-deposit table 74a (step S302), and the process goes to step S301.

When association information has not been received (step S301; No), the pre-deposit amount notification unit 75b determines whether or not identification information of a medium has been received from the POS register 20 (step S303). When identification information has not been received from the POS register 20 (step S303; No), the process goes to step S301. When identification information has been received (step S303; Yes), the pre-deposit amount notification unit 75b determines whether or not the identification information has already been registered on the pre-deposit table 74a (step S304).

When the identification information has been registered on the pre-deposit table 74a (step S304; Yes), the pre-deposit amount notification unit 75b reads out a pre-deposit amount associated with the identification information, and notifies the POS register 20 of the pre-deposit amount (step S305). When the identification information has not been registered on the pre-deposit table 74a (step S304; No), the pre-deposit amount notification unit 75b notifies the POS register 20 of an error (step S306).

After step S305 or step S306, the pre-deposit amount notification unit 75b determines whether or not to end the process (step S307), and goes to step S301 when determining not to end the process (step S307; No). The pre-deposit amount notification unit 75b ends the series of processes when determining to end the process (step S307; Yes).

When the checkout process has been performed, a flag indicating that the pre-deposit amount has already been used for checkout may be set on the pre-deposit table 74a to avoid a situation that one pre-deposit amount is used multiple times. In this configuration, whether or not the identification information has been registered is determined in step S304, and whether or not the pre-deposit amount has already been used for checkout is also determined in step S304. The process goes to step S305 if the pre-deposit amount has not been used, and goes to step S306 when the pre-deposit amount has already been used.

In the above description, manned checkout counters and deposit machines 10 are installed in the store 1. However, in a commercial complex or the like containing a plurality of stores as tenants, a deposit machine 10 is not necessarily installed in each store. That is, a medium with which a pre-deposit amount is associated can be made available in a plurality of stores.

Figure 16:
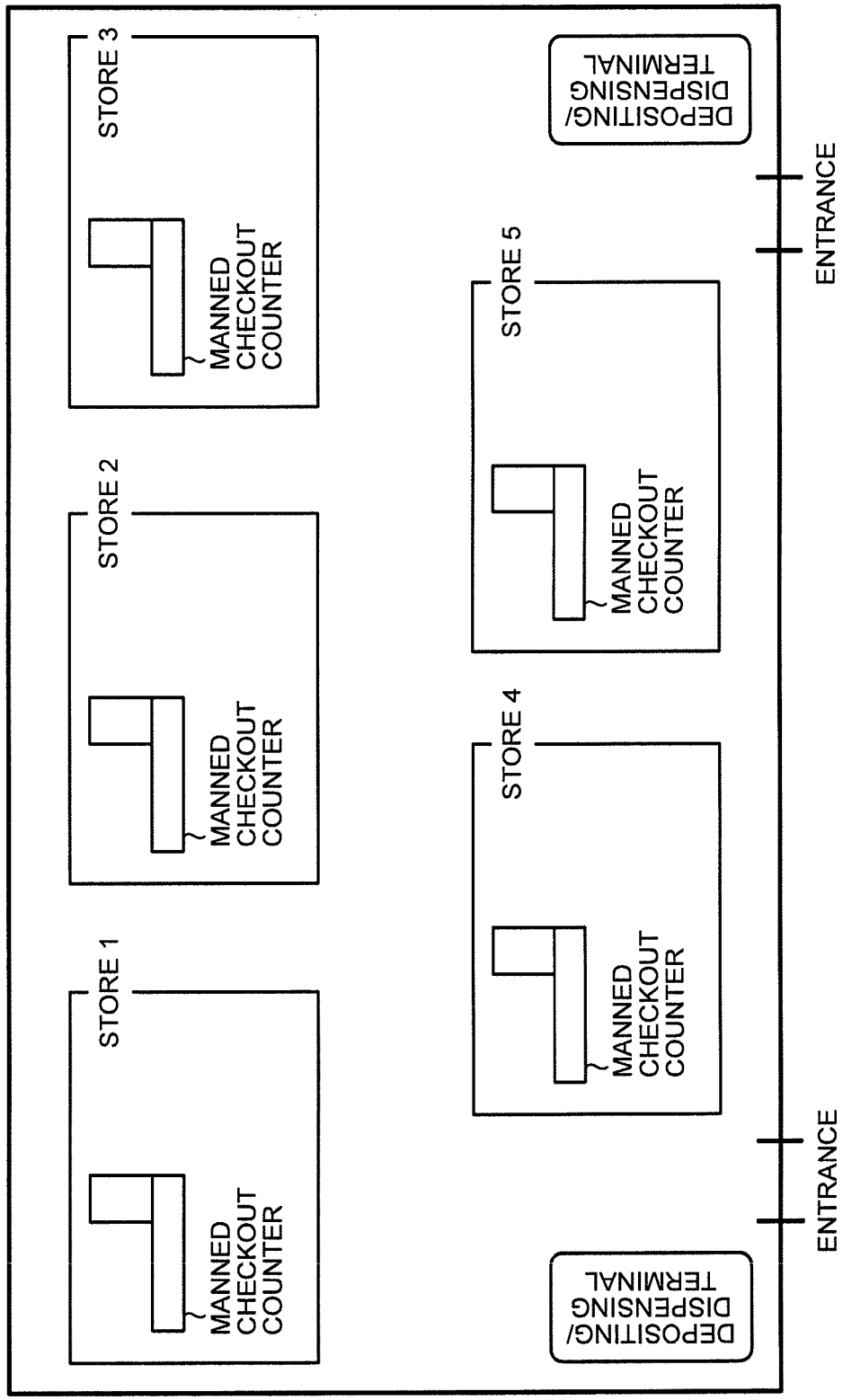
FIG. 16 shows a configuration in which a medium with which a pre-deposit amount is associated is made available in a plurality of stores.

FIG. 16 shows a configuration in which a medium with which a pre-deposit amount is associated is made available in a plurality of stores. In FIG. 16, a commercial complex contains stores 1 to 5 as tenants. Each store is provided with a manned checkout counter. Depositing/dispensing terminals are installed in common areas near entrances of the commercial complex.

Each depositing/dispensing terminal is a device having a function as a deposit machine 10. The depositing/dispensing terminal performs association of a pre-deposit amount to a medium, for example, issuance of a pre-deposit receipt. At the manned checkout counter in each store, a pre-deposit amount is obtained from the pre-deposit receipt and used for a checkout process.

When dispensing of change is required during the checkout process, the change may be dispensed at the manned checkout counter where the checkout process has been performed. If a depositing process is performed by using a common device while a dispensing process is performed at each store, only dispensing processes are performed at each store without depositing of cash, which may complicate appropriate management of cash. Therefore, the depositing/dispensing terminal is configured to dispense the change for the checkout process.

When dispensing of change is performed at the depositing/dispensing terminal, a change dispense receipt which designates the amount of change is issued at the manned checkout counter where the checkout process has been performed. The depositing/dispensing terminal reads the change dispense receipt and dispenses money corresponding to the amount of change.

As described above, in the checkout system according to Embodiment 1, the deposit machine 10 receives deposited money and stores the money therein, and then associates a negotiable value corresponding to the amount of the received money, as a pre-deposit amount, with a predetermined medium used for checkout for commodities. The POS register 20 acquires the pre-deposit amount associated with the medium and performs a checkout process, and change is dispensed from the change machine 30 according to need. This configuration eliminates the necessity of depositing money received from a customer into the change machine 30, thereby realizing a speedy and efficient checkout process.

As for a medium with which a pre-deposit amount is associated, for example, a pre-deposit receipt, on which a code indicating the pre-deposit amount is printed, is used. The pre-deposit amount being coded enables the POS register 20 to read the pre-deposit amount with the barcode reader for reading barcodes attached to commodities. Handling of a pre-deposit amount is not limited to a receipt on which a barcode is printed. For example, it is allowable to issue and use an IC card or the like, in which a pre-deposit amount is stored.

As for a medium with which a pre-deposit amount is associated, a license or the like may be used. In this case, the deposit machine 10 reads identification information from a medium such as a license, and transmits the identification information together with a pre-deposit amount to the management device 70. The management device 70 stores the identification information of the medium in association with the pre-deposit amount. When receiving the identification information of the medium from the POS register 20, the management device 70 notifies the POS register 20 of the pre-deposit amount associated with the identification information.

An expiration date is desirably set on a pre-deposit amount. Specifically, for example, use of a pre-deposit amount is limited to the same day the money was deposited. In this case, the customer may use the pre-deposit amount or make a withdrawal before leaving the store. The POS register 20 and the change machine 30 are configured to handle withdrawal of a pre-deposit amount of money. Preferably, the deposit machine 10 is also configured to handle withdrawals.

Embodiment 2

In Embodiment 1 described above, a cashier performs registration of commodities and operation regarding checkout. In Embodiment 2, the present invention is applied to a semi-self-checkout system and a self-checkout system. In the semi-self-checkout system, a POS register performing registration of commodities and a checkout device performing checkout are installed away from each other. A cashier operates the POS register to perform registration of commodities, and a customer operates the checkout device to perform checkout. In the self-checkout system, a customer performs, by himself/herself, both the operation regarding registration of commodities and the operation regarding checkout.

<Configuration and Operation of Semi-Self-Checkout System>

Figure 17:
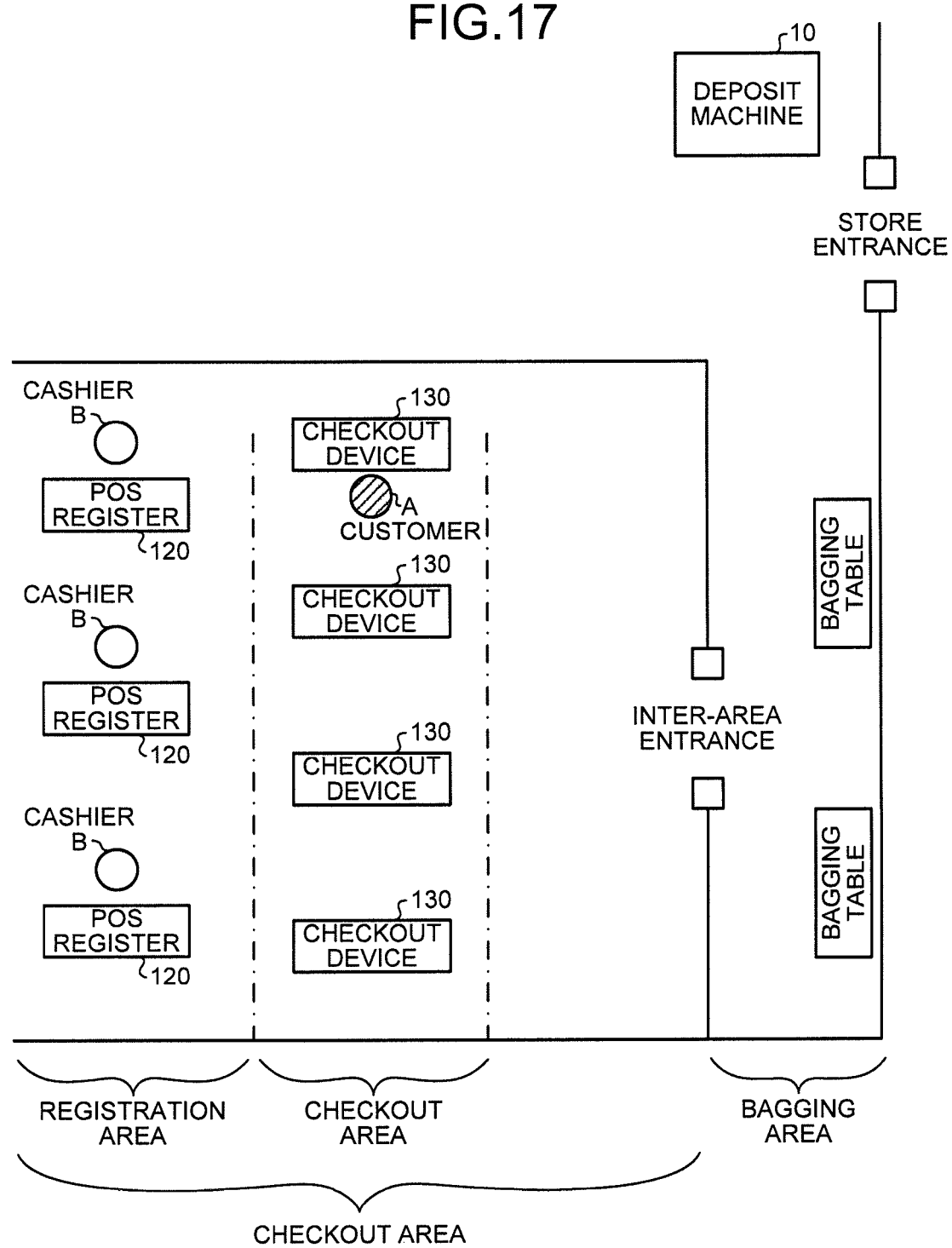
FIG. 17 shows a specific example of a layout in which a semi-self-checkout system is adopted.

FIG. 17 shows a specific example of a layout adopting the semi-self-checkout system. In the example shown in FIG. 17, a deposit machine 10 is installed near an entrance of a store. The store has a checkout area and a bagging area, and an inter-area entrance is disposed between the checkout area and the bagging area.

The checkout area includes a registration area where registration of commodities is performed, and a checkout area where checkout is performed. In the registration area, a plurality of POS registers 120 are installed, and cashiers B who operate the POS registers 120 are assigned to the respective POS registers 120. In the checkout area, a plurality of checkout devices 130 which are operable by customers are installed.

In the configuration shown in FIG. 17, a customer, who has entered the store, first performs pre-deposit of money with the deposit machine 10 and receives a pre-deposit receipt. Then, the customer puts desired commodities in a shopping basket in the store, enters the registration area, and hands the shopping basket to the cashier B. The cashier B operates the POS register 120 to register the commodities in the shopping basket. After all the commodities have been registered, the POS register 120 issues a purchased commodity receipt. On the purchased commodity receipt, information on the commodities purchased by the customer, and a code indicating a checkout amount, are printed. When the number of commodities is one, the checkout amount is the price of the commodity. When there are a plurality of commodities, the checkout amount is the total of the prices of the commodities.

The customer goes to the checkout device 130, with the purchased commodity receipt and the shopping basket in which the registered commodities are present. The customer causes the checkout device 130 to read the purchased commodity receipt and the pre-deposit receipt. Then, the checkout device 130 obtains the checkout amount and the pre-deposit amount from the respective receipts, performs a checkout process, and dispenses change according to need. After the checkout process, the customer leaves the checkout area, and bags the commodities at a bagging table disposed in the bagging area.

Figure 18:
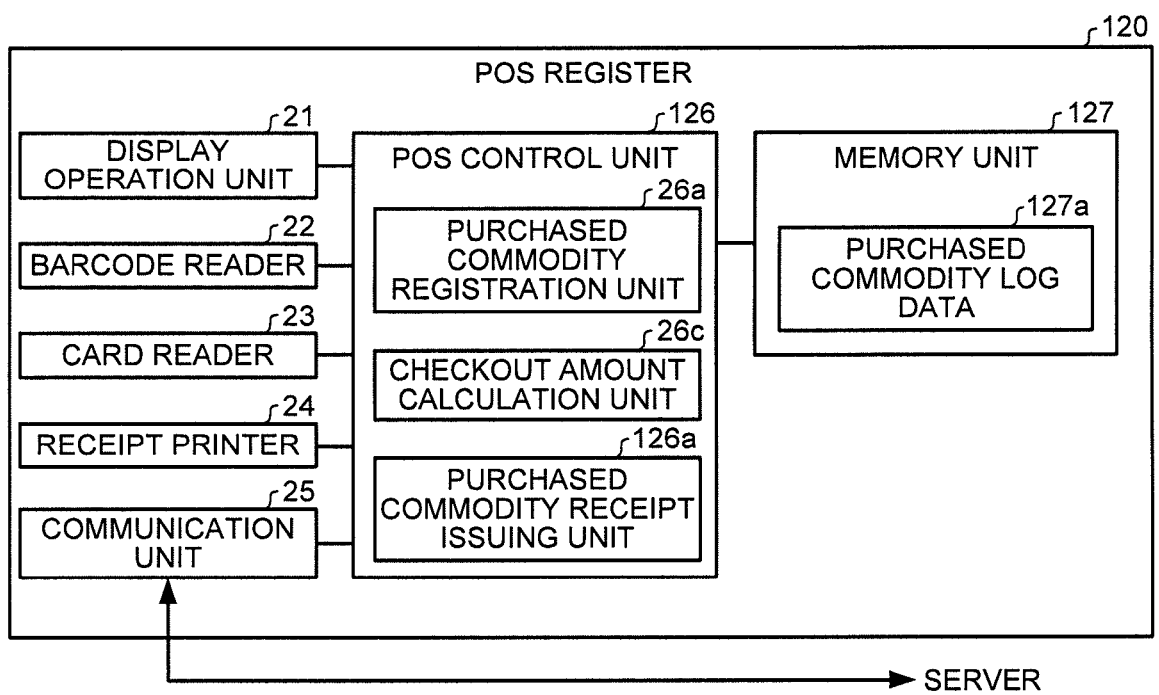
FIG. 18 is a functional block diagram showing a functional configuration of a POS register shown in FIG. 17.

Next, a functional configuration of the POS register 120 shown in FIG. 17 will be described. FIG. 18 is a functional block diagram showing the functional configuration of the POS register 120 shown in FIG. 17. As shown in FIG. 18, the POS register 120 includes a display operation unit 21, a barcode reader 22, a card reader 23, a receipt printer 24, a communication unit 25, a POS control unit 126, and a memory unit 127.

Since the display operation unit 21, the barcode reader 22, the card reader 23, the receipt printer 24, and the communication unit 25 are identical to those of the POS register 20 according to Embodiment 1, repeated description is omitted.

The memory unit 127 is a storage device implemented by, for example, a nonvolatile memory such as a flash memory, or a secondary storage such as a hard disk drive. The memory unit 127 stores therein purchased commodity log data 127a. The purchased commodity log data 127a includes information on registered commodities (names, quantities, prices, etc., of the commodities), a checkout amount, date and time, identification information of the POS register 120, identification information of the cashier B, and the like.

The POS control unit 126 controls the entirety of the POS register 120. The POS control unit 126 includes a purchased commodity registration unit 26a, a checkout amount calculation unit 26c, and a purchased commodity receipt issuing unit 126a.

The purchased commodity registration unit 26a performs registration of commodities to be purchased. Specifically, when the barcode reader 22 reads a barcode attached to a commodity and acquires information such as the name and price of the commodity, the purchased commodity registration unit 26a performs registration of the commodity by using the acquired information. The registered commodity is displayed on the display operation unit 21. The checkout amount calculation unit 26c sums up the prices of all commodities registered by the purchased commodity registration unit 26a to calculate a checkout amount. The calculated checkout amount is displayed on the display operation unit 21.

The purchased commodity receipt issuing unit 126a issues a purchased commodity receipt. Specifically, the purchased commodity receipt issuing unit 126a generates a code indicating the checkout amount calculated by the checkout amount calculation unit 26c, and causes the receipt printer 24 to print the generated code, thereby issuing a purchased commodity receipt. On the purchased commodity receipt, information on the registered commodities (names, quantities, prices, etc., of the commodities), a checkout amount, date and time, identification information of the POS register 120, identification information of the cashier B, etc., may be further printed. Part or all of these pieces of information may be coded and printed on the purchased commodity receipt.

When performing issuance of the purchased commodity receipt, the purchased commodity receipt issuing unit 126a registers, on the purchased commodity log data 127a, the information on the registered commodities (names, quantities, prices, etc., of the commodities), the checkout amount, the date and time, the identification information of the POS register 120, the identification information of the cashier B, etc.

Figure 19:
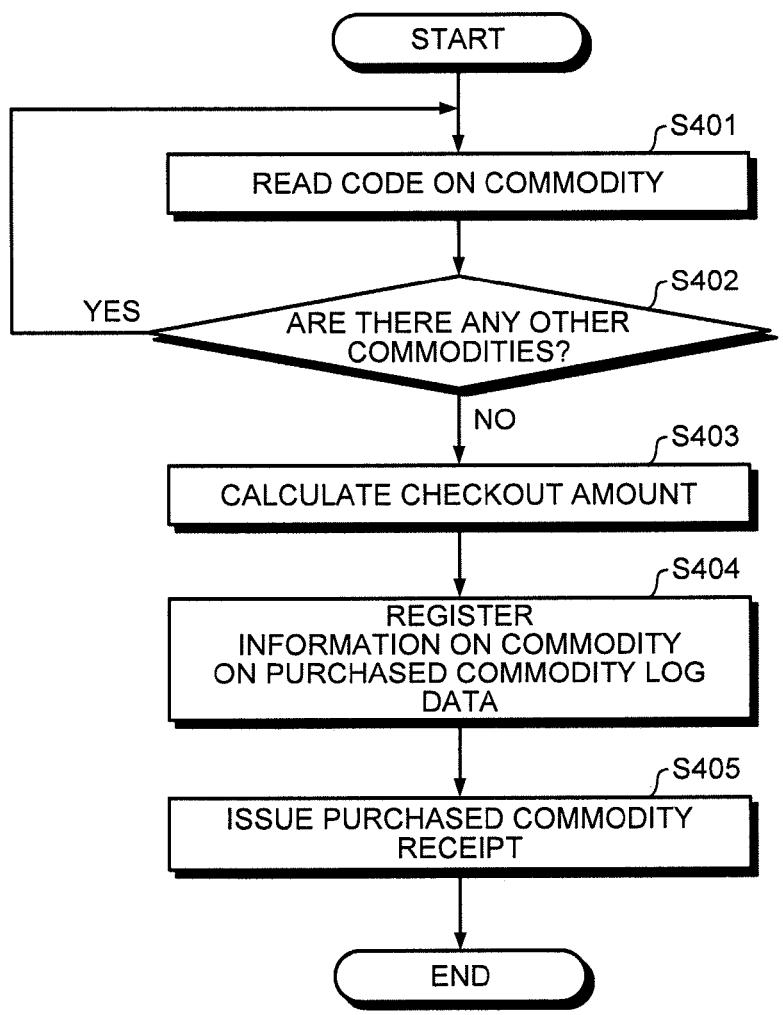
FIG. 19 is a flowchart showing a process procedure performed by the POS register shown in FIG. 17.

Next, a process procedure performed by the POS register 120 will be described. FIG. 19 is a flowchart showing the process procedure performed by the POS register 120. First, the purchased commodity registration unit 26a reads a barcode attached to a commodity with the barcode reader 22 (step S401). When there are more commodities (step S402; Yes), the purchased commodity registration unit 26a goes to step S401 and reads a barcode attached to a next commodity.

When the barcodes of all the commodities have been read (step S402; No), the checkout amount calculation unit 26c sums up the prices of all the commodities to calculate a checkout amount (step S403). Thereafter, the purchased commodity receipt issuing unit 126a performs registration on the purchased commodity log data 127a (step S404) and issuance of a purchased commodity receipt (step S405) to end the process.

Figure 20:
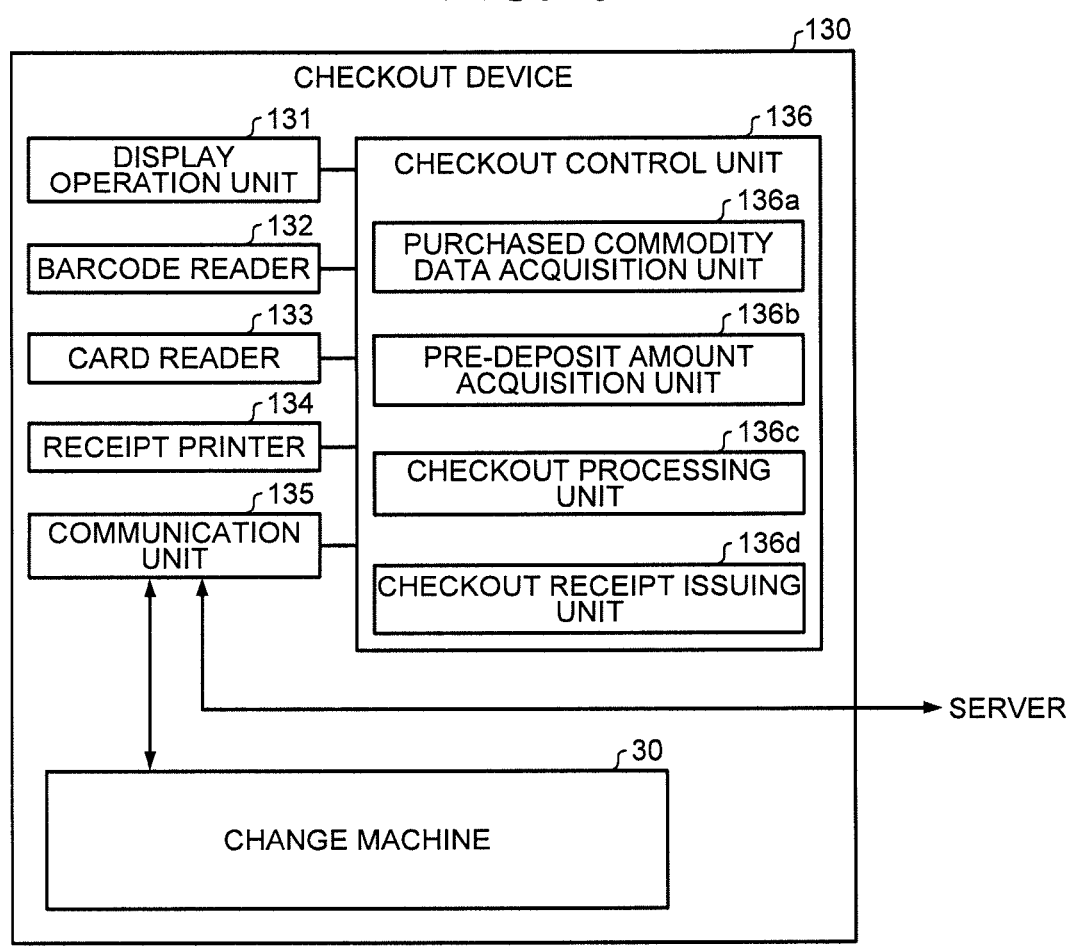
FIG. 20 is a functional block diagram showing an internal configuration of a checkout device shown in FIG. 17.

Next, a functional configuration of the checkout device 130 shown in FIG. 17 will be described. FIG. 20 is a functional block diagram showing the functional configuration of the checkout device 130 shown in FIG. 17. As shown in FIG. 20, the checkout device 130 includes a display operation unit 131, a barcode reader 132, a card reader 133, a receipt printer 134, a communication unit 135, and a checkout control unit 136. Further, the checkout device 130 contains a change machine 30. Since the configuration and operation of the change machine 30 are identical to those of Embodiment 1, repeated description is omitted.

The display operation unit 131 performs output of information to a customer as an operator, and receives an input from the customer as an operator. The barcode reader 132 is used for reading codes on a pre-deposit receipt, and codes on a purchased commodity receipt. The card reader 133 is used for checkout with a payment card such as a credit card, a debit card, or a prepaid card.

The receipt printer 134 is used for issuing a checkout receipt on which the content of transaction is printed. For example, the content of transaction printed on the receipt includes date and time, names and prices of registered commodities, an amount of inserted money, a pre-deposit amount, an amount of change, and a point balance. The communication unit 135 is a communication interface for communication with the change machine 30 and an external server.

The checkout control unit 136 controls the entirety of the checkout device 130. The checkout control unit 136 includes a purchased commodity data acquisition unit 136a, a pre-deposit amount acquisition unit 136b, a checkout processing unit 136c, and a checkout receipt issuing unit 136d.

The purchased commodity data acquisition unit 136a reads codes printed on a purchased commodity receipt, with the barcode reader 132, and acquires information on the checkout amount and the commodities.

The pre-deposit amount acquisition unit 136b reads codes printed on a pre-deposit receipt, with the barcode reader 132, and acquires a pre-deposit amount. When an ID of a point card is included in the codes printed on the pre-deposit receipt, the pre-deposit amount acquisition unit 136b further acquires the ID of the point card.

The checkout processing unit 136c performs a checkout process in which settlement for the checkout amount acquired by the purchased commodity data acquisition unit 136a is performed to complete the transaction. The settlement of the checkout amount can be made using the pre-deposit amount. In the checkout process using the pre-deposit amount, if the pre-deposit amount is insufficient, the checkout processing unit 136c receives an additional deposit into the change machine 30, adds the amount of the additional deposit to the pre-deposit amount, and continues the checkout process. In the checkout process using the pre-deposit amount, if the pre-deposit amount exceeds the checkout amount, the checkout processing unit 136c causes the change machine 30 to dispense change corresponding to a difference between the amounts.

The checkout process may be performed using a payment card or cash. When settlement using a payment card is selected, the checkout processing unit 136c acquires information such as a card ID from a payment card inserted in the card reader 133, and transmits this information together with the checkout amount to the external server, thereby performing the settlement. When settlement by cash is selected, the checkout processing unit 136c transmits the checkout amount to the change machine 30, thereby performing the settlement, and completes the settlement upon receiving checkout completion notification from the change machine 30.

Upon completion of the checkout process, the checkout receipt issuing unit 136d issues a checkout receipt by using the receipt printer 134. As already described above, on the checkout receipt, date and time, names and prices of registered commodities, an amount of inserted money, a pre-deposit amount, an amount of change, a point balance, etc., are printed.

Figure 21:
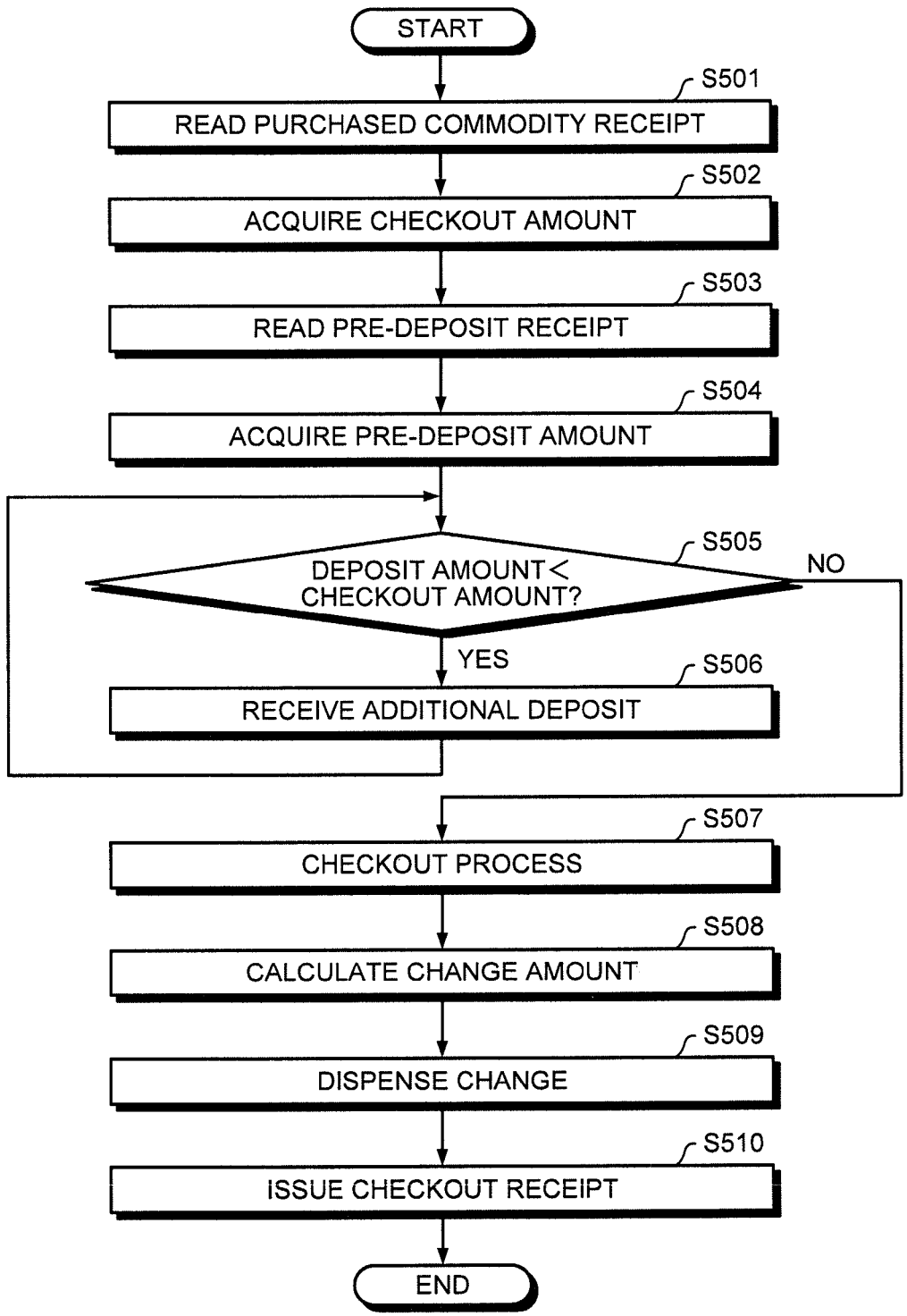
FIG. 21 is a flowchart showing a process procedure performed by the checkout device shown in FIG. 17.

Next, a process procedure performed by the checkout device 130 will be described. FIG. 21 is a flowchart showing the process procedure performed by the checkout device 130. First, the purchased commodity data acquisition unit 136a reads a code printed on a purchased commodity receipt with the barcode reader 132 (step S501) and acquires a checkout amount (step S502). Further, the pre-deposit amount acquisition unit 136b reads a code printed on the pre-deposit receipt with the barcode reader 132 (step S503) and acquires a pre-deposit amount (step S504).

When the pre-deposit amount is less than the checkout amount (step S505; Yes), the checkout processing unit 136c receives additional deposit of money (step S506). When the deposit amount including the pre-deposit amount and the amount of the additional deposit becomes equal to or more than the checkout amount (step S505; No), the checkout processing unit 136c performs settlement of the checkout amount to execute a checkout process (step S507). The checkout processing unit 136c calculates the amount of change (step S508), and causes the change machine 30 to dispense the change (step S509). Thereafter, the checkout receipt issuing unit 136d issues a checkout receipt by using the receipt printer 134 (step S510) to end the process.

The checkout system may be configured such that, when the checkout process is performed using a pre-deposit receipt, information that specifies the pre-deposit receipt (e.g., identification information of the pre-deposit receipt itself) is managed as already-used pre-deposit receipt information to avoid a situation that one pre-deposit receipt is used multiple times. In this configuration, when the pre-deposit receipt is read in step S503, whether the pre-deposit receipt is valid, i.e., whether or not the pre-deposit receipt is stored as an already-used pre-deposit receipt, is determined. When the pre-deposit receipt is determined to be valid, step S504 and subsequent steps are performed. When there are a plurality of checkout counters at which the pre-deposit receipt is available, information on already-used pre-deposit receipts is managed to be shared among the checkout counters.

<Configuration of Self-Checkout System>

Figure 22:
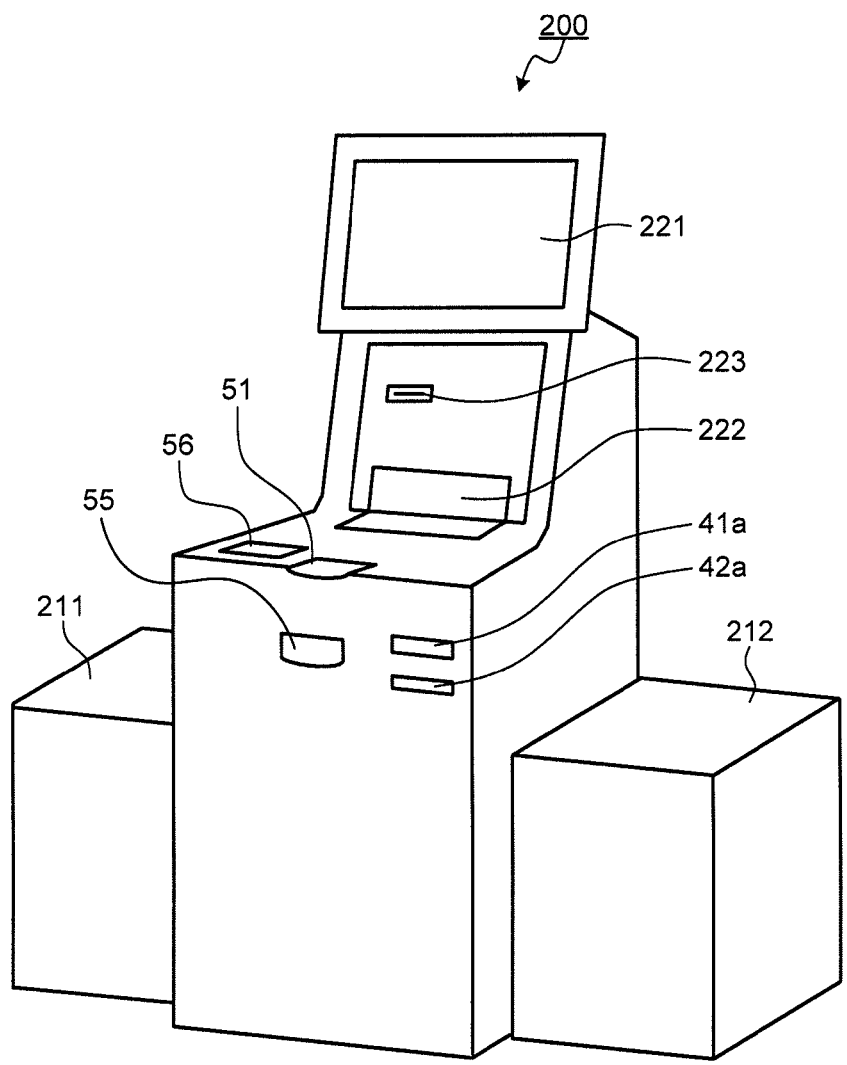
FIG. 22 shows an external configuration of a checkout device used for a self-checkout system.

Next, a checkout device used for a self-checkout system will be described. FIG. 22 shows an external configuration of a checkout device 200 used for a self-checkout system. The checkout device 200 includes a POS register 220 and a change machine 30. The checkout device 200 includes: a display operation unit 221, a barcode reader 222, and a card reader 223 of the POS register 220; and a display operation unit 56, a banknote inlet 41a, a banknote outlet 42a, a coin inlet 51, and a coin outlet 55 of the change machine 30.

The checkout device 200 is provided with a commodity table 211 and a commodity table 212. One of the commodity tables 211 and 212 is a table on which unregistered commodities are placed while the other is a table on which registered commodities are placed. When the commodity table 211 is used for placement of unregistered commodities while the commodity table 212 is used for placement of registered commodities, for example, the commodity table 211 is given an illustration of a shopping basket while the commodity table 212 is given an illustration of a plastic bag.

A customer places a shopping basket, in which commodities to be purchased are put, on the commodity table 211. The customer takes out each commodity, holds the commodity over the barcode reader 222 to register the commodity, and puts the commodity on the commodity table 212.

The customer repeats this work. The barcode reader 222 reads a barcode attached to each commodity to acquire information such as the name, price, etc., of the commodity. The checkout device 200 performs registration of each commodity by using the information acquired from the barcode. The barcode reader 222 is also used for reading a pre-deposit receipt.

The display operation unit 221 of the POS register 220 is composed of a liquid crystal touch panel display or the like. The display operation unit 221 performs display of operation guidance, display of information of registered commodities, and reception of various operation inputs. The card reader 223 is used for checkout with a payment card such as a credit card, a debit card, or a prepaid card.

The banknote inlet 41*a* and the coin inlet 51 are used for insertion of banknotes and coins, respectively. The banknote outlet 42*a* and the coin outlet 55 are used for dispensing of banknotes and coins, respectively. For example, after registration of the commodities, the customer checks the price displayed on the display operation unit 21, and inserts money as compensation for the commodities through the banknote inlet 41*a* and/or the coin inlet 51. When dispensing of change is needed, the checkout device 200 executes dispensing of money, as the change, to the banknote outlet 42*a* and/or the coin outlet 55.

The display operation unit 56 of the change machine 30 is composed of a liquid crystal touch panel display or the like. The display operation unit 56 performs display regarding the change machine 30, such as display of an inventory amount of money, for each denomination, stored in the change machine 30, and display regarding detected failure. The display operation unit 56 also performs reception of operation regarding the change machine 30.

Figure 23:
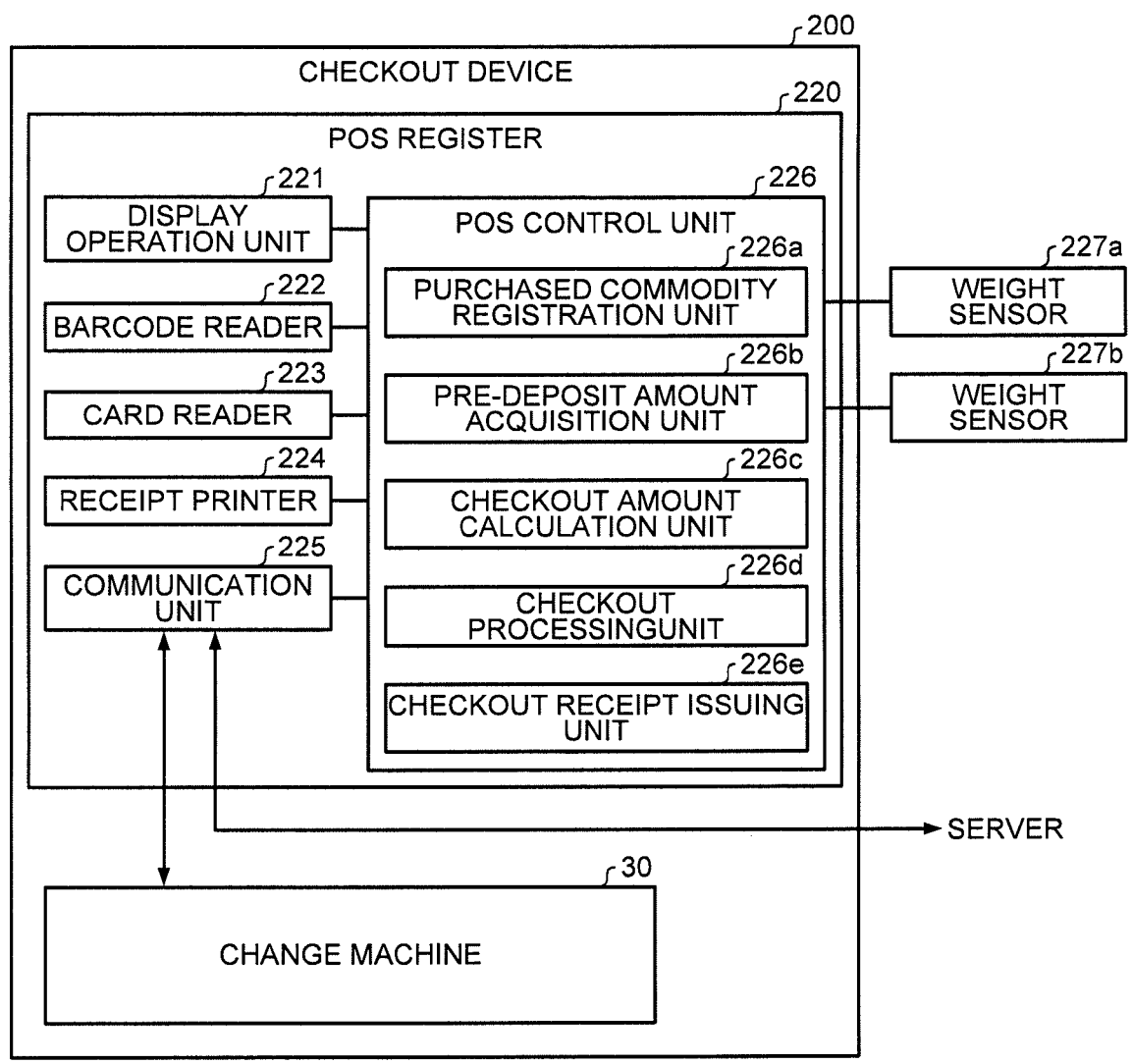
FIG. 23 is a functional block diagram showing a functional configuration of the checkout device shown in FIG. 22.

FIG. 23 is a functional block diagram showing a functional configuration of the checkout device 200. As shown in FIG. 23, the checkout device 200 includes a POS register 220 performing registration of commodities, and a change machine 30 performing depositing/dispensing of money. Since the configuration and operation of the change machine 30 are identical to those of Embodiment 1, repeated description is omitted.

The POS register 220 includes a receipt printer 224, a communication unit 225, and a POS control unit 226, in addition to the display operation unit 221, the barcode reader 222, and the card reader 223 described above. The receipt printer 224 is used for issuing a checkout receipt on which the content of transaction is printed. For example, the content of transaction printed on the receipt includes date and time, names and prices of registered commodities, an amount of inserted money, a pre-deposit amount, an amount of change, and a point balance. The communication unit 225 is a communication interface for communication with the change machine 30 and an external server.

The POS control unit 226 controls the entirety of the POS register 220. The POS control unit 226 includes a purchased commodity registration unit 226*a*, a pre-deposit amount acquisition unit 226*b*, a checkout amount calculation unit 226*c*, a checkout processing unit 226*d*, and a checkout receipt issuing unit 226*e*. The POS control unit 226 obtains weight measurement results from a weight sensor 227*a* disposed at the commodity table 211 and a weight sensor 227*b* disposed at the commodity table 212. An exemplary case where the weight sensor 227*a* is disposed at the commodity table 211 used for placement of unregistered commodities while the weight sensor 227*b* is disposed at the commodity table 212 used for placement of registered commodities, will be described.

The purchased commodity registration unit 226*a* performs registration of commodities to be purchased. Specifically, when the barcode reader 222 reads a barcode attached to a commodity to acquire information such as the name, price, etc., of the commodity, the purchased commodity registration unit 226*a* registers the commodity by using the acquired information, and causes the display operation unit 221 to display information on the registered commodity.

The purchased commodity registration unit 226*a* determines whether or not the registered commodity is placed on the commodity table 212, based on the measurement results of the weight sensor 227*a* and the weight sensor 227*b*. When the registered commodity is placed on the commodity table 212, registration of a next commodity is allowed.

A reduction in the measurement result of the weight sensor 227*a*, which occurs before registration of a commodity, corresponds to the weight of the commodity. When the measurement result of the weight sensor 227*b* is increased by the weight of the commodity, it is determined that the registered commodity is placed on the commodity table 212, and then registration of a next commodity is allowed.

When the measurement result of the weight sensor 227*a* becomes equal to the weight of the shopping basket and thus the purchased commodity registration unit 226*a* determines that a final registered commodity has been placed on the commodity table 212, registration of the commodities is ended.

The pre-deposit amount acquisition unit 226*b* causes the barcode reader 222 to read a code printed on a pre-deposit receipt and acquires a pre-deposit amount. When an ID of a point card is included in the code printed on the pre-deposit receipt, the pre-deposit amount acquisition unit 226*b* further acquires the ID of the point card.

The checkout amount calculation unit 226*c* sums up the prices of all the commodities registered by the purchased commodity registration unit 226*a* to calculate a checkout amount, and causes the display operation unit 221 to display the checkout amount.

The checkout processing unit 226*d* performs a checkout process in which settlement of the checkout amount calculated by the checkout amount calculation unit 226*c* is performed to complete the transaction. The settlement of the checkout amount can be made using the pre-deposit amount. In the checkout process using the pre-deposit amount, if the pre-deposit amount is insufficient, the checkout processing unit 226*d* receives additional deposit to the change machine 30, adds the amount of the additional deposit to the pre-deposit amount, and continues the checkout process. If the pre-deposit amount exceeds the checkout amount in the checkout process using the pre-deposit amount, the checkout processing unit 226*d* causes the change machine 30 to dispense, as change, money corresponding to a difference between the amounts.

The checkout process may be performed by using a payment card or cash. When settlement using a payment card is selected, the checkout processing unit 226*d* acquires information such as a card ID from the payment card inserted in the card reader 223, and transmits the information together with the checkout amount to the external server, thereby performing the settlement. When settlement by cash is selected, the checkout processing unit 226*d* transmits the checkout amount to the change machine 30, thereby performing the settlement, and completes the settlement upon receiving checkout completion notification from the change machine 30.

Upon completion of the checkout process, the checkout receipt issuing unit 226*e* issues a checkout receipt by using the receipt printer 224. On the checkout receipt, date and time, names and prices of registered commodities, an amount of inserted money, a pre-deposit amount, an amount of change, a point balance, etc., are printed, as described above.

As described above, even when the semi-self-checkout system or the self-checkout system is used, as in Embodiment 1, a negotiable value corresponding to the amount of money received by the deposit machine 10 is associated with a predetermined medium, the checkout process is performed by using the pre-deposit amount, and change is dispensed from the change machine 30 according to need. This configuration eliminates the necessity of depositing money received from a customer into the change machine 30, thereby realizing a speedy and efficient checkout process.

As in Embodiment 1, a pre-deposit receipt, an IC card, a license, etc., can be used as a medium with which a pre-deposit amount is associated. Further, as in Embodiment 1, an expiration date can be set on the pre-deposit amount.

In Embodiments 1 and 2 described above, the deposit machine 10 handles only banknotes. However, the deposit machine 10 may be configured to handle both banknotes and coins.

In Embodiments 1 and 2 described above, a pre-deposit receipt is issued with an identification number thereof being printed thereon. However, identification information of a pre-deposit receipt is not always necessary. For example, instead of using such identification information, a used pre-deposit receipt may be collected, or a used pre-deposit receipt may be subjected to printing indicating that the receipt has already been used.

An identification number of a pre-deposit receipt itself may be managed to reconcile an already-used pre-deposit, although detailed description thereof has been omitted in Embodiments 1 and 2. Likewise, whether or not a pre-deposit receipt has already been used may be managed with a flag on the pre-deposit table 74a to perform reconciliation.

A pre-deposit receipt is not limited to be used alone, but a plurality of pre-deposit receipts may be added up to be used. Likewise, when multiple times of pre-deposit have been performed in association with one identification information of a license or the like, a plurality of pre-deposit amounts associated with the same identification information on the pre-deposit table 74a may be added up to be used.

In Embodiments 1 and 2 described above, the present invention is applied to a checkout system in a supermarket or the like. However, the present invention is not limited thereto, and is applicable to any checkout system.

The constituent elements described in the above embodiments and modifications are conceptually functional constituent elements, and thus may not be necessarily configured as physical constituent elements, as illustrated in the drawings. That is, distributed or integrated forms of each device are not limited to the forms illustrated in the drawings, but all or some of the forms may be distributed or integrated functionally or physically in any unit depending on various loads, use statuses, or the like.

As described above, the money depositing apparatus and the checkout system according to the present invention are useful for realizing a speedy and efficient checkout process at a checkout counter in a store.

As described above, the present invention is directed to a money receiving unit configured to receive money; a money storing unit configured to store therein the money received by the money receiving unit; and an association unit configured to associate a negotiable value corresponding to an amount of the money received by the money receiving unit, with a predetermined medium used for checkout for purchasing a commodity.

In the above configuration, the negotiable value is available for the checkout performed by using a predetermined money handling apparatus.

In the above configuration, the negotiable value is available for the checkout performed by using a predetermined money handling apparatus in a day when the amount of money is associated with the predetermined medium.

The above configuration further includes a reading unit configured to read information stored in a storage medium possessed by a customer. The association unit is configured to associate the negotiable value corresponding to the amount of the money received by the money receiving unit, and the information read by the reading unit, with the predetermined medium used for the checkout.

In the above configuration, the association unit includes: a code generation unit configured to generate a code of the negotiable value corresponding to the amount of the money received by the money receiving unit; a printing unit configured to print the code generated by the code generation unit, on a predetermined receipt used for checkout for commodities; and a receipt issuing unit configured to issue the predetermined receipt on which the code is printed by the printing unit.

In the above configuration, the association unit includes: a data generation unit configured to generate data of the negotiable value corresponding to the amount of the money received by the money receiving unit; and a control unit configured to perform control so as to store the data of the negotiable value generated by the data generation unit, in a predetermined storage medium used for the checkout.

Furthermore, as described above, the present invention is directed to a checkout system in which a POS device and a money handling apparatus are communicably connected, the money handling apparatus being configured to recognize and count money, store the money in a storing unit, and dispense change. The checkout system includes a money depositing apparatus including: a money receiving unit configured to receive money; a money storing unit configured to store therein the money received by the money receiving unit; and an association unit configured to associate a negotiable value corresponding to an amount of the money received by the money receiving unit, with a predetermined medium used for checkout performed by using the money handling apparatus for purchasing a commodity. The POS device is configured to, when an amount of money corresponding to the negotiable value associated with the predetermined medium is more than an amount of money to be paid for the checkout, instruct the money handling apparatus to dispense, as change, money corresponding to a difference between the amount of money associated with the predetermined medium and the amount of money to be paid for the checkout.

The above configuration further includes a management device communicably connected to the money depositing apparatus and the money handling apparatus. The management device includes a memory unit configured to store therein identification information that uniquely identifies the predetermined medium, in association with the negotiable value associated with the predetermined medium.

In the above configuration, the money depositing apparatus further includes a notification unit configured to, on condition that association by the association unit has been performed, notify the management device of association information which includes the identification information that uniquely identifies the predetermined medium, and the negotiable value associated with the predetermined medium. The money handling apparatus includes: an acquisition unit configured to acquire the identification information of the predetermined medium; a request unit configured to request the management device to notify a negotiable value corresponding to the identification information acquired by the identification information acquisition unit; and a control unit configured to, when an amount of money corresponding to the negotiable value, which corresponds to the identification information of the predetermined medium and is notified from the management device, is more than an amount of money to be paid for the checkout, perform control so as to dispense, as change, money corresponding to a difference between the amount of money associated with the predetermined medium and the amount of money to be paid for the checkout.

In the above configuration, the POS device is configured to, when an amount of money corresponding to the negotiable value associated with the predetermined medium is less than an amount of money to be paid for the checkout, instruct the money handling apparatus to receive additional money, and perform the checkout with a total of the amount of money corresponding to the negotiable value and an amount of the additional money received by the money handling apparatus.

According to the present invention, a speedy and efficient checkout process at a checkout counter in a store is realized, whereby a queue of waiting customers at the checkout counter can be reduced.

Although the invention has been explained with respect to specific embodiments for a complete and clear disclosure, the appended claims are not to be thus limited but are to be construed as embodying all modifications and alternative constructions that may occur to one skilled in the art that fairly fall within the basic teaching of the claims.

The invention claimed is:

1. A checkout method performed by a checkout system including a money depositing apparatus, a POS register, a money handling apparatus and a management device, the method comprising a pre-deposit process, and a checkout process to be performed after the pre-deposit process has been performed, wherein the pre-deposit process comprises:
receiving money from a customer by the money depositing apparatus;
acquiring, by the money depositing apparatus, identification information from a predetermined medium carried by the customer, wherein the customer carrying the predetermined medium is capable of being identified based on the identification information acquired from the predetermined medium;
generating, by the money depositing apparatus, association information in which a pre-deposit amount of the money received by the money depositing apparatus is associated with the identification information acquired by the money depositing apparatus;
transmitting, by the money depositing apparatus, the association information to the management device; and
registering, by the management device, the association information transmitted from the money depositing apparatus in a pre-deposit table, and the checkout process comprises:
acquiring, by the POS register, the identification information from the predetermined medium carried by the customer;
transmitting, by the POS register, the identification information acquired by the POS register to the management device;
reading out, by the management device, the pre-deposit amount associated with the transmitted identification information out of the association information registered in the pre-deposit table;
transmitting, by the management device, the pre-deposit amount read out from the pre-deposit table to the POS register;
performing a checkout of a commodity that the customer purchases, by the POS register and the money handling apparatus, with using the pre-deposit amount transmitted from the management device;
instructing, by the POS register, the money handling apparatus to dispense, as change, the stored money of an amount corresponding to a difference amount between the pre-deposit amount associated with the identification information of the predetermined medium and a checkout amount to be paid for purchasing the commodity;
instructing, when the pre-deposit amount associated with the identification information of the predetermined medium is less than the checkout amount, by the POS register, the money handling apparatus to receive additional money to perform the checkout process with a total of the pre-deposit amount and an amount of the additional money received by the money handling apparatus; and
performing, when the total amount becomes larger than the checkout amount, by the money handling apparatus, the checkout with the total amount and the checkout amount.

2. The checkout method according to claim 1, wherein the POS register is configured to calculate the checkout amount to be paid for purchasing the commodity in the checkout process.

3. The checkout method according to claim 1, wherein the money handling apparatus is configured to store money therein and to dispense the stored money in the checkout process.

4. The checkout method according to claim 1, wherein the management device is communicably connected to the money depositing apparatus and the money handling apparatus.

5. The checkout method according to claim 1, the checkout process further comprising:
reading, by the POS register, a code attached to the commodity that the customer purchases; and
calculating, by the POS register, the checkout amount to be paid for purchasing the commodity.

6. The checkout method according to claim 1, wherein the predetermined medium includes at least one of a point card, a license, an insurance card, and a mobile device.

7. The checkout method according to claim 2, the checkout process further comprising:
instructing, by the POS register, the money handling apparatus to receive the additional money; and
performing, when the pre-deposit amount is less than the checkout amount, by the POS register and the money handling apparatus, the checkout with the total of the pre-deposit amount and an amount of the additional money received by the money handling apparatus.

8. The checkout method according to claim 2, the checkout process further comprising:
dispensing, by the money handling apparatus, the change corresponding to the difference amount between the pre-deposit amount and the checkout amount based on the instruction from the POS register when the pre-deposit amount is more than the checkout amount.

9. The checkout method according to claim 1, wherein the checkout for purchasing the commodity is performed by using a payment card or cash.

10. A checkout method performed by a checkout system including a money depositing apparatus, a POS register, a money handling apparatus and a management device, the method comprising a pre-deposit process, and a checkout process to be performed after the pre-deposit process has been performed, wherein the pre-deposit process comprises:
   receiving money from a customer by the money depositing apparatus;
   acquiring, by the money depositing apparatus, identification information from a predetermined medium carried by the customer, wherein the customer carrying the predetermined medium is capable of being identified based on the identification information acquired from the predetermined medium;
   generating, by the money depositing apparatus, association information in which a pre-deposit amount of the money received by the money depositing apparatus is associated with the identification information acquired by the money depositing apparatus;
   transmitting, by the money depositing apparatus, the association information to the management device; and
   registering, by the management device, the association information transmitted from the money depositing apparatus in a pre-deposit table, and the checkout process comprises:
   acquiring, by the POS register, the identification information from the predetermined medium carried by the customer;
   transmitting, by the POS register, the identification information acquired by the POS register to the management device;
   reading out, by the management device, the pre-deposit amount associated with the transmitted identification information out of the association information registered in the pre-deposit table;
   transmitting, by the management device, the pre-deposit amount read out from the pre-deposit table to the POS register; and
   performing a checkout of a commodity that the customer purchases, by the POS register and the money handling apparatus, based on the pre-deposit amount transmitted from the management device and a checkout amount to be paid for purchasing the commodity, wherein in a case where the pre-deposit amount is less than the checkout amount, the money handling apparatus receives additional money and the checkout is performed with the checkout amount and a total of the pre-deposit amount and an amount of the additional money received by the money handling apparatus after the total amount becomes larger than the checkout amount.

\* \* \* \* \*